United States Patent
Tsai et al.

(10) Patent No.: US 12,517,395 B1
(45) Date of Patent: Jan. 6, 2026

(54) DISPLAY DEVICE WITH REFLECTION ATTENUATION LAYERS AND RELATED METHODS

(71) Applicant: Taiwan Semiconductor Manufacturing Company Limited, Hsin-Chu (TW)

(72) Inventors: Hung-Chih Tsai, Hsin-Chu (TW); Wel-Li Yin, Hsinchu County (TW); Kuo Liang Wang, Hsinchu (TW)

(73) Assignee: Taiwan Semiconductor Manufacturing Company Limited, Hsin-Chu (TW)

( * ) Notice: Subject to any disclaimer, the term of this patent is extended or adjusted under 35 U.S.C. 154(b) by 0 days.

(21) Appl. No.: 18/882,863

(22) Filed: Sep. 12, 2024

(51) Int. Cl.
  *G02F 1/1345* (2006.01)
  *G02F 1/1335* (2006.01)

(52) U.S. Cl.
  CPC ...... *G02F 1/133553* (2013.01); *G02F 1/1345* (2013.01)

(58) Field of Classification Search
  CPC .............. G02F 1/133565; G02F 1/133553
  USPC ................................................. 349/113
  See application file for complete search history.

(56) References Cited

U.S. PATENT DOCUMENTS

| | | | |
|---|---|---|---|
| 6,133,976 A * | 10/2000 | Kimura | G02F 1/136209 349/110 |
| 7,956,972 B2 * | 6/2011 | Liao | G02F 1/136277 349/137 |
| 9,946,134 B2 * | 4/2018 | Miller | G02F 1/133504 |
| 2004/0105056 A1 * | 6/2004 | Iida | G02F 1/133553 349/113 |
| 2017/0090245 A1 * | 3/2017 | Tsuchiya | G02F 1/133553 |
| 2022/0236612 A1 * | 7/2022 | Kozakai | G02F 1/13452 |

* cited by examiner

*Primary Examiner* — Christopher M Raabe
(74) *Attorney, Agent, or Firm* — Cooper Legal Group, LLC

(57) ABSTRACT

A device is provided. The device includes: a liquid crystal layer; an electrode layer on a first side of the liquid crystal layer; and a backplane attached to a second side of the liquid crystal layer opposite the first side. The backplane includes: a conductive structure operable to form a voltage difference with the electrode layer; a reflective structure between the conductive structure and the liquid crystal layer; a first reflection attenuation layer on first sidewalls of the conductive structure and a first upper surface of the conductive structure; and a second reflection attenuation layer on second sidewalls of the reflective structure, the second reflection attenuation layer defining an opening therein, a second upper surface of the reflective structure being exposed by the opening.

20 Claims, 31 Drawing Sheets

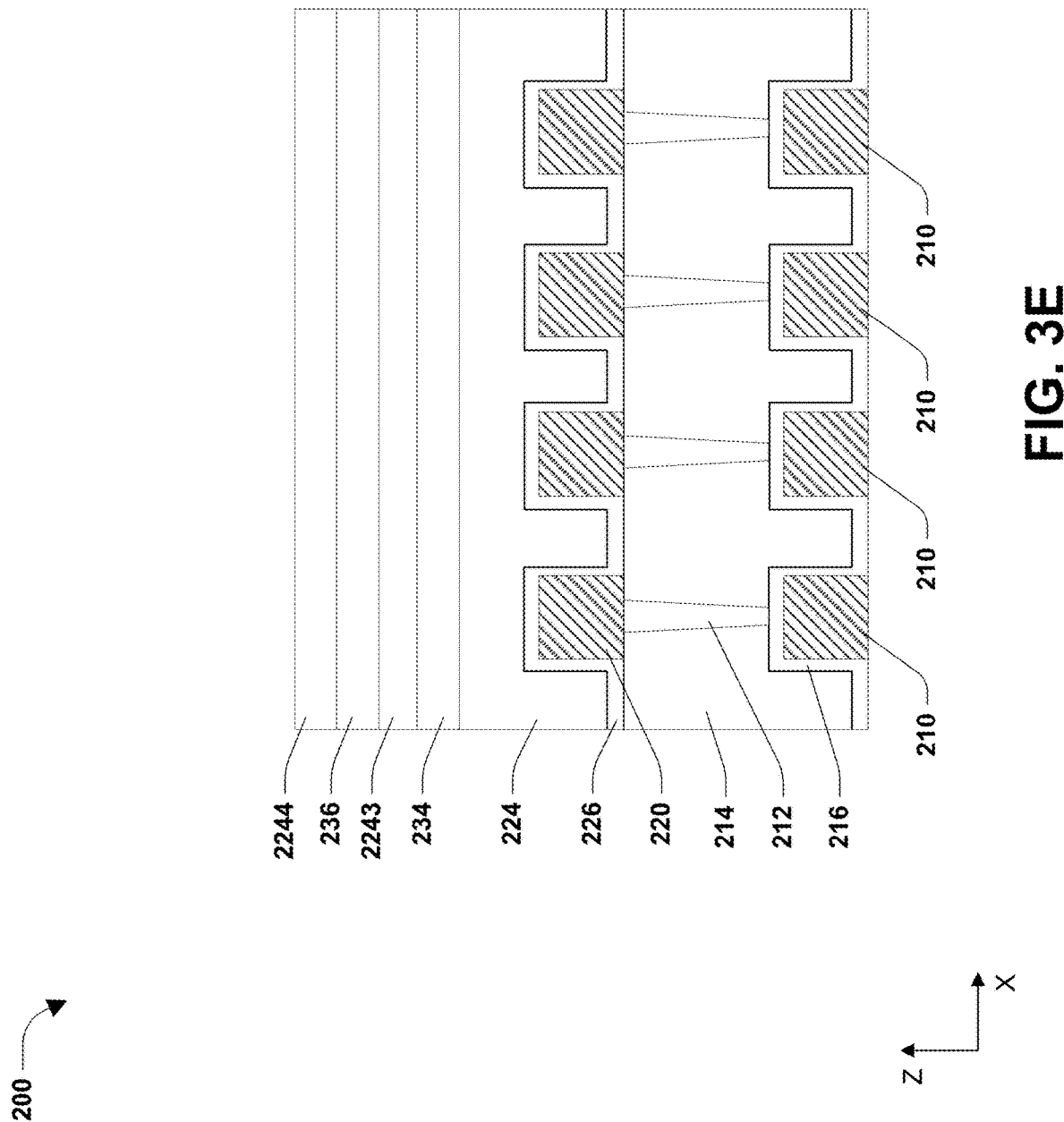

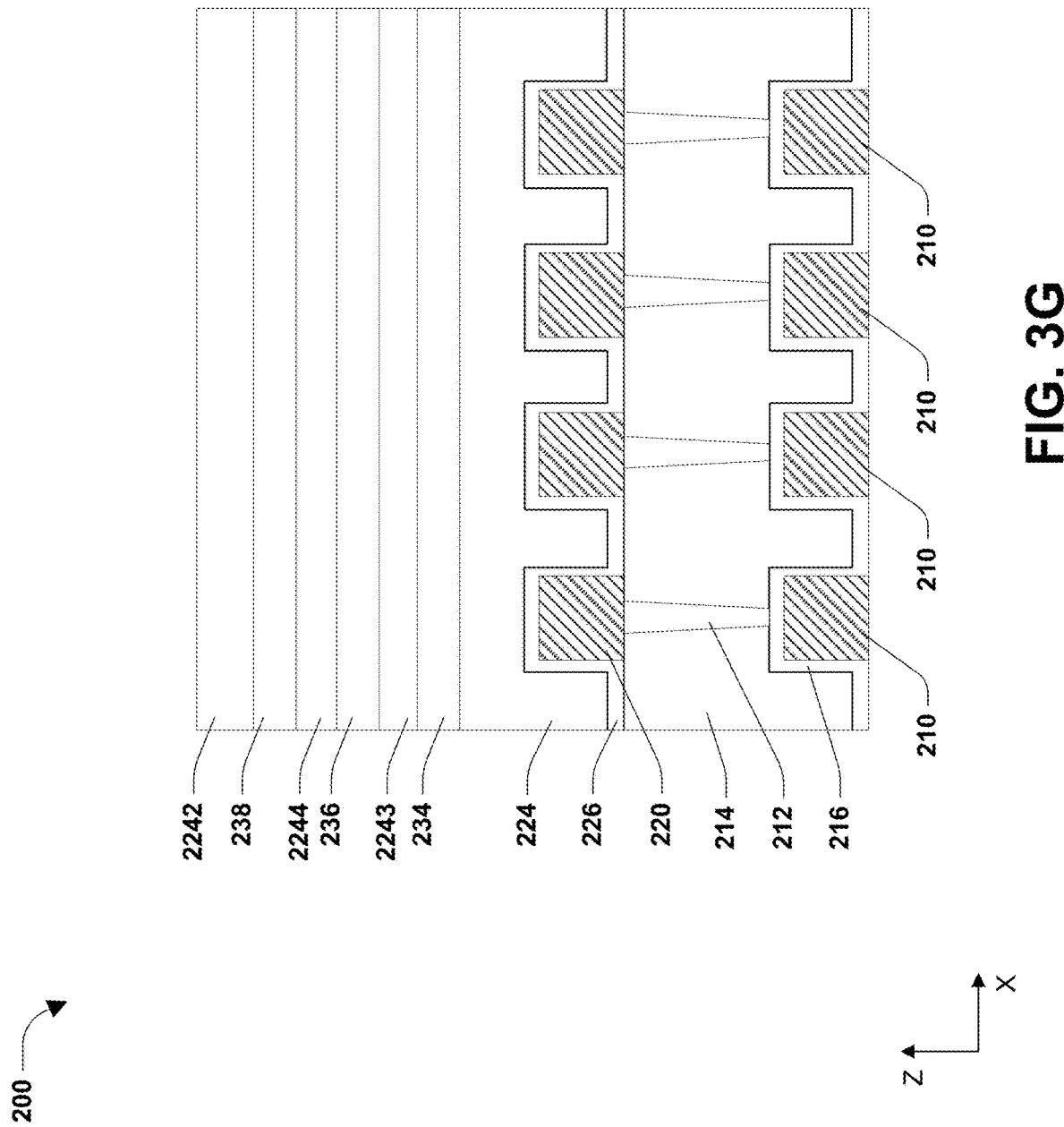

DISPLAY DEVICE WITH REFLECTION ATTENUATION LAYERS AND RELATED METHODS

BACKGROUND

Semiconductor devices are formed on, in, and/or from semiconductor wafers, and are used in a multitude of electronic devices, such as mobile phones, laptops, desktops, tablets, watches, gaming systems, and various other industrial, commercial, and consumer electronics. One or more semiconductor fabrication processes are performed to form semiconductor devices on, in, and/or from a semiconductor wafer.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A, 3B, 3C, 3D, 3E, 3F, 3G and 3H illustrate diagrammatic side views of a display device at intermediate steps of fabrication, in accordance with some embodiments.

DETAILED DESCRIPTION

Figure 1:
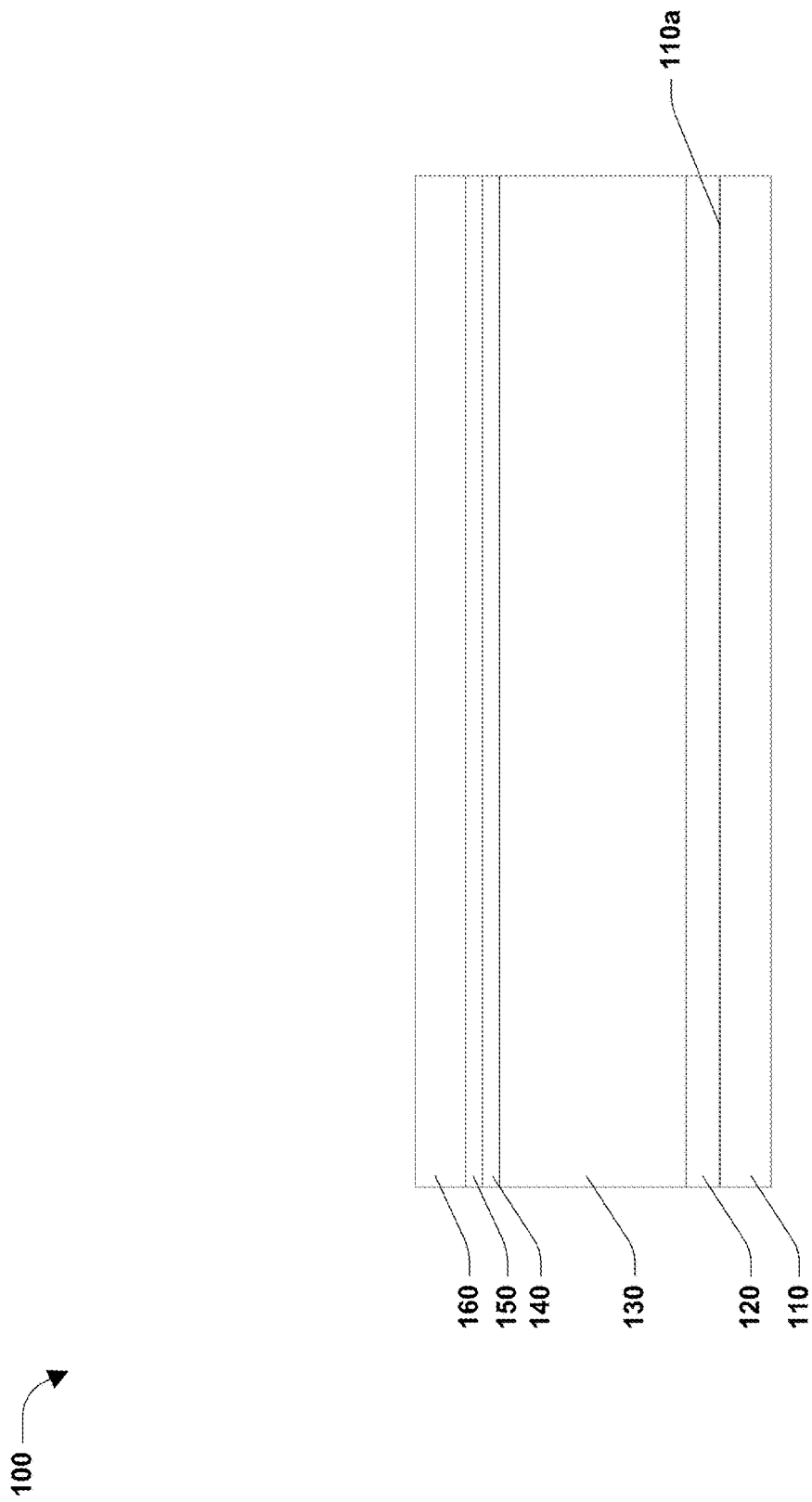
FIG. 1 illustrates a diagrammatic side view of a liquid crystal on silicon (LCOS) display device, in accordance with some embodiments.

The following disclosure provides several different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals or letters in the various examples. This repetition is for the purpose of simplicity and clarity and does not in itself dictate a relationship between the various embodiments or configurations discussed.

Further, spatially relative terms, such as "beneath," "below," "lower," "above," "upper" and the like, may be used herein for ease of description to describe one element or feature's relationship to other element(s) or feature(s) as illustrated in the figures. The spatially relative terms are intended to encompass different orientations of the device in use or operation in addition to the orientation illustrated in the figures. The apparatus may be otherwise oriented (rotated 90 degrees or at other orientations) and the spatially relative descriptors used herein may likewise be interpreted accordingly.

The term "overlying" and/or the like may be used to describe one element or feature being vertically coincident with and at a higher elevation than another element or feature. For example, a first element overlies a second element if the first element is at a higher elevation than the second element and at least a portion of the first element is vertically coincident with at least a portion of the second element.

The term "underlying" and/or the like may be used to describe one element or feature being vertically coincident with and at a lower elevation than another element or feature. For example, a first element underlies a second element if the first element is at a lower elevation than the second element and at least a portion of the first element is vertically coincident with at least a portion of the second element.

The term "over" may be used to describe one element or feature being at a higher elevation than another element or feature. For example, a first element is over a second element if the first element is at a higher elevation than the second element.

The term "under" may be used to describe one element or feature being at a lower elevation than another element or feature. For example, a first element is under a second element if the first element is at a lower elevation than the second element.

Liquid crystal on silicon (LCOS) reflective light valves are liquid crystal microlens reflectors in which liquid crystal materials are integrated with silicon wafers to form liquid crystal microlens reflectors. In LCOS devices, such as an LCOS display device, blooming is a phenomenon in which light reflects off the surface of an object, causing a surrounding area to look overexposed, losing detail and clarity due to the high reflectivity. For the LCOS device, blooming reduces image quality.

In embodiments of the disclosure, one or more reflection attenuation layers is included in the LCOS display device. In some embodiments, a single layer of SiON film or a multilayer including two or more of SiON, $Al_2O_3$ or MgO/TiN films is included in the LCOS display device around and/or below a mirror metal thereof. Inclusion of the reflection attenuation layer(s) improves a light leakage absorption/anti-reflection effect.

FIG. 1 illustrates a diagrammatic side view of a display device 100 or simply "device 100" or "display 100" in accordance with some embodiments. In some embodiments, the device 100 is a liquid crystal on silicon (LCOS) display device 100, which may be or include an LCOS reflective light valve, and may be referred to as "the LCOS display device 100." The device 100 is described in detail herein to provide context for understanding embodiments of a backplane and related methods that are described with reference to FIGS. 2A-8.

The display device 100 includes one or more of a substrate 110, a first or lower alignment layer 120 on the substrate, a liquid crystal layer 130 on the first alignment layer 120, a second or upper alignment layer 140 on the liquid crystal layer 130, an electrode layer 150 on the second alignment layer 140, and a cover layer 160 on the electrode layer 150. The first and second alignment layers 140 can be referred to collectively as the alignment layers 120, 140 throughout.

In some embodiments, the substrate 110 comprises at least one of a substrate, a photomask, a semiconductor device, a dielectric layer, an epitaxial layer, a silicon-on-insulator (SOI) structure, a semiconductor layer, a conductive material layer, a die, etc. The substrate 110 comprises at least one of silicon, germanium, carbide, arsenide, gallium, arsenic, phosphide, indium, antimonide, SiGe, SiC, GaAs, GaN, GaP, InGaP, InP, InAs, InSb, GaAsP, AlInAs, AlGaAs, GaInAs, GaInP, GaInAsP, or other suitable material. The substrate 110 comprises at least one of monocrystalline silicon, crystalline silicon with a <100> crystallographic orientation, crystalline silicon with a <110> crystallographic orientation, crystalline silicon with a <111> crystallographic orientation or other suitable material. Other structures and/or configurations of the substrate 110 are within the scope of the present disclosure.

Components of the LCOS display device 100 can be integrated to achieve improved performance. In some embodiments, the substrate 110 is or includes a complementary metal-oxide-semiconductor (CMOS) backplane 110, which can include silicon having integrated CMOS circuitry thereon and/or therein. The substrate 110 may be referred to as the CMOS backplane 110, the backplane 110, or the semiconductor CMOS backplane 110 throughout. The backplane 110 can include transistors that individually control voltage for each of a number of pixels used for modulating liquid crystals. Above the CMOS backplane 110 lies the first alignment layer 120, which may be composed of a polymer or high surface energy material like polyimide. The first alignment layer 120 can include patterns or grooves that guide an initial orientation of the liquid crystals within the subsequently formed liquid crystal layer 130.

The liquid crystal layer 130 is on the first alignment layer 120 and has rod-shaped liquid crystal molecules dispersed therein. The molecules align according to cues provided by the alignment layers 120, 140, selecting optical properties of the display. To improve uniformity of alignment, the second alignment layer 140 can further refine the orientation of liquid crystals in the liquid crystal layer 130. Positioned above the second alignment layer 140, the electrode layer 150 can be or include transparent conductive materials, such as indium tin oxide (ITO) or conductive polymers. The electrode layer 150 enables precise manipulation of liquid crystal orientation by applying electric fields, dictated by the underlying CMOS circuitry. For example, the electrode layer 150 can be a common electrode layer, and the CMOS backplane 110 can include pixel electrodes that are driven by individual driving circuits, such as transistors.

The display 100 is sealed and protected by the cover layer 160, which may be or include glass or another transparent material. This outermost layer shields the internal components from external elements while allowing light to pass through, improving durability and longevity of the display device 100.

Although not separately illustrated, a system including the display device 100 may further have a light source for projecting light onto the backplane 110 through the liquid crystal layer 130. The light incident on the backplane 110 may be altered by the liquid crystal layer 130 based on voltages applied to the pixel electrodes of the backplane 110, then the altered light may be reflected out of the display device 100 by mirror pixels at an upper surface 110a of the backplane 110. The mirror pixels and underlying metal layers of the CMOS backplane 110 can be highly reflective, which can result in a blooming effect that reduces clarity of an image formed by the reflected light produced by the mirror pixels.

Embodiments of the disclosure include reflection attenuating layers positioned at one or more selected locations in the CMOS backplane 110 that can effectively reduce the blooming effect and improve the clarity of the outputted image.

FIGS. 2A-2K illustrate diagrammatic side views of a portion of a semiconductor device or backplane 200, in accordance with some embodiments. The backplane 200 is an embodiment of the CMOS backplane 110 of FIG. 1 and can be similar in many respects thereto.

The backplane 200 performs at least two functions. A first function of the backplane 200 is to reflect incoming light from an upper surface 230a thereof (see also the upper surface 110a of FIG. 1) via reflective or mirror structures 230 (or "mirror features 230"). Namely, light incident on the upper surface 230a via the liquid crystal layer 130 thereover is reflected by the reflective structures 230.

A second function of the backplane 200 is to, in tandem with a common electrode, such as the electrode layer 150 of FIG. 1, form localized electrical fields across the liquid crystal layer 130 at positions distributed across the upper surface 230a of the backplane 200. The localized electrical fields may be formed by applying pixel voltages via conductive features or structures 210, 212, 220 that are under the reflective structures 230. Liquid crystals of the liquid crystal layer 130 are materials that have rod-shaped molecules that can be influenced by electric fields. In the LCOS device 100, the pixel voltage alters the orientation of the molecules within the liquid crystal layer 130. The liquid crystal layer 130 then acts like a variable wave retarder. Depending on the orientation of the molecules caused by the pixel voltage, the light passing through undergoes a different phase shift. This phase shift affects how the light interacts with the mirror structures 230 on the backplane 200, influencing an output image.

Structure of the backplane 200 in accordance with some embodiments is described with reference to FIGS. 2A-2K.

Figure 2A:
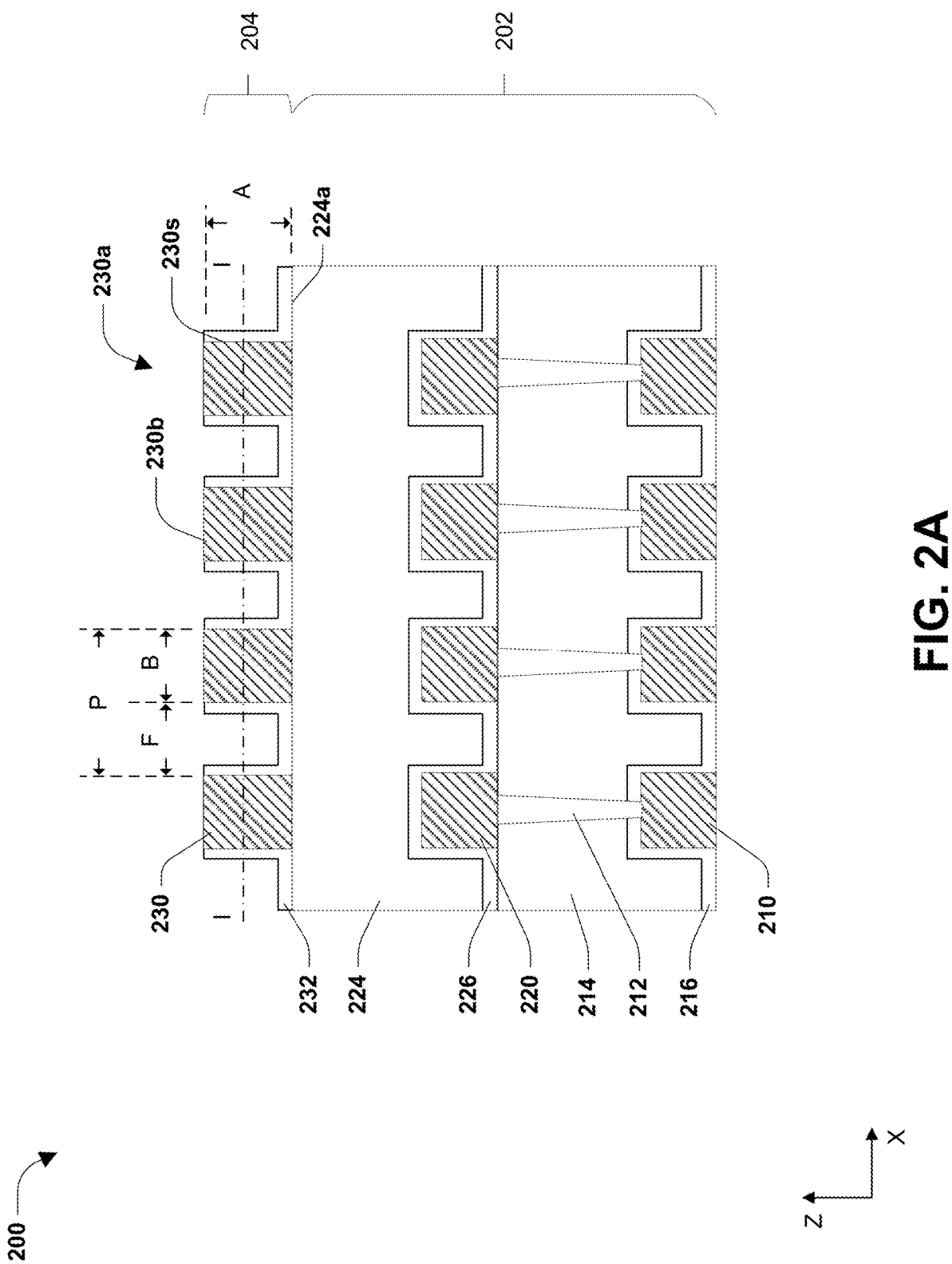
FIG. 2A illustrates a diagrammatic side view of a substrate of an LCOS display device, in accordance with some embodiments.
Figure 2B:
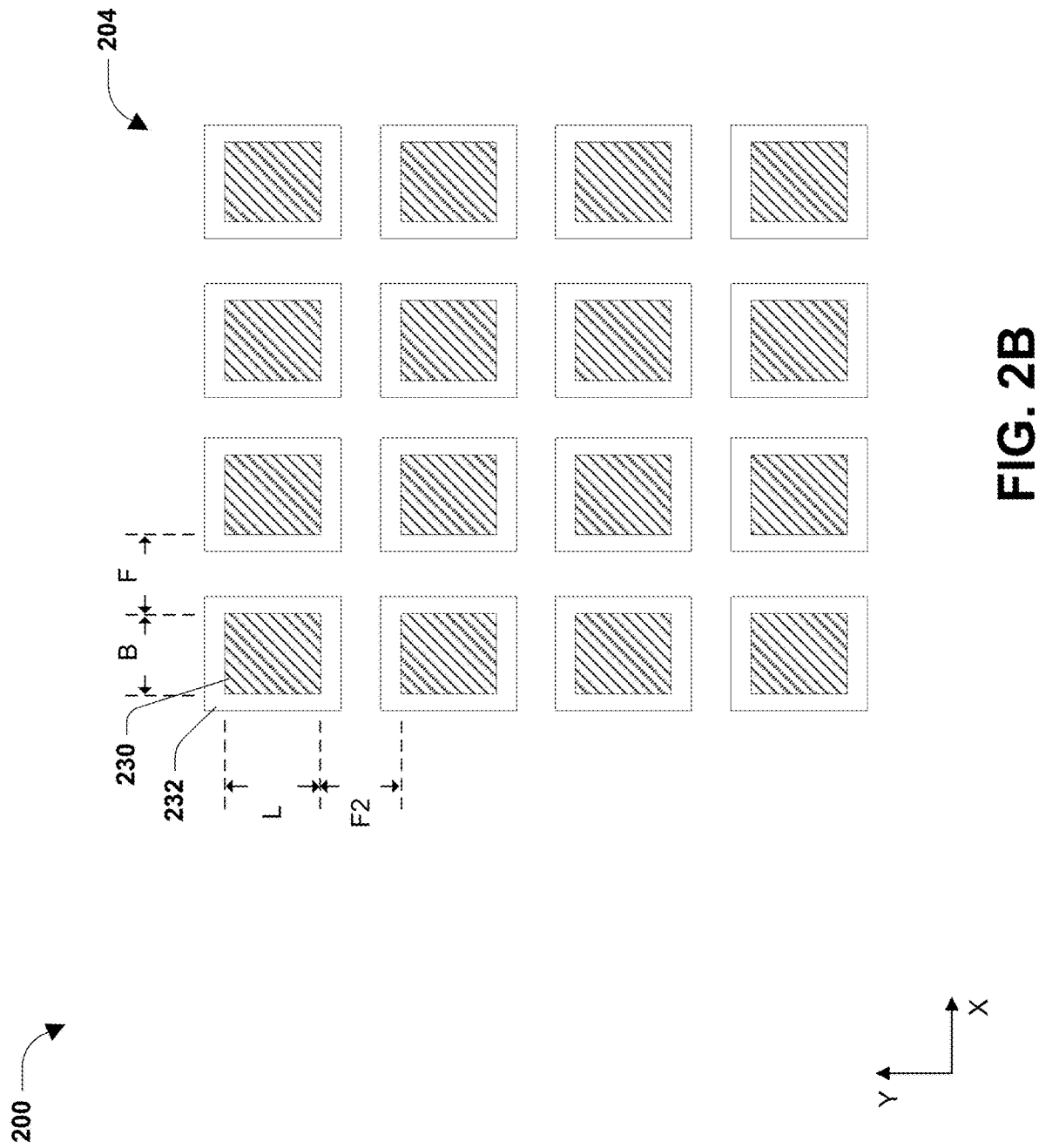
FIG. 2B illustrates a diagrammatic top view of the substrate of FIG. 2A along line I-I, in accordance with some embodiments.

In FIG. 2A, the backplane 200 includes a vertical stack of interconnect layers 202 that underlies a reflective layer 204. FIG. 2B is a cross-sectional plan view of the backplane 200 along line I-I depicted in FIG. 2A.

In some embodiments, the interconnect layers 202 include conductive features 210, 220 embedded in dielectric or insulating layers 214, 224, respectively. The dielectric layer 224 is stacked on the dielectric layer 214 in the vertical direction (e.g., the Z-axis direction in FIG. 2A). Conductive structures or vias 212 (or simply "vias 212") electrically connect respective pairs of a conductive feature 210 and a conductive feature 220 to each other. The conductive features 210, 220 and the conductive vias 212 can be referred to collectively as the conductive features 210, 212, 220.

In some embodiments, the dielectric or insulating layers 214, 224 may serve as interlayer dielectric (ILD) layers and may be a single layer or include multiple dielectric layers with the same or different dielectric materials. For example, the insulating layers 214, 224 may each be a single layer made of silicon oxide, tetraethyl orthosilicate (TEOS), phosphosilicate glass (PSG), borosilicate glass (BSG), boron-doped phosphosilicate glass (BPSG), fluorosilicate glass (FSG), undoped silicate glass (USG), or the like. The insulating layers 214, 224 may be deposited using any suitable method, such as a chemical vapor deposition (CVD) process, a plasma enhanced CVD (PECVD) process, flowable CVD (FCVD) process, the like, or a combination thereof.

The conductive features 210, 212, 220 can be or include one or more of metal contacts, metal vias, metal wires/traces and the like. The conductive features 210, 212, 220 are each depicted as including a single material, but may include one or more material layers. For example, the conductive features 210, 212, 220 may include metal layers that are covered or surrounded by one or more barrier layers, liner layers, or the like. The barrier and/or liner layers can be, for example, transition metal nitrides, such as TiN, TaN, or the like. The metal layers of the conductive features 210, 212, 220 can be or include Co, W, Ru, Ni, Rh, Al, Mo, a metal compound, or the like. The metal layers may be formed by a chemical vapor deposition (CVD) process, a physical vapor deposition, (PVD) process, an atomic layer deposition (ALD) process, an electroless deposition (ELl)) process, an electrochemical plating (ECP) process, or another suitable process.

Thin material layers 216, 226 are present on the conductive features 210, 220, respectively, and are positioned between the conductive features 210, 220 and the adjacent dielectric layers 214, 224, respectively. The thin material layer 226 operates to reduce or eliminate reflection of the light that passes between the mirror features 230 into the interconnect layers 202 and can be referred to alternatively as the antireflection layer 226, the reflection attenuation layer 226, the light absorption layer 226 or the dielectric layer 226 throughout the description.

Each of the thin material layers 216, 226 can be a conformal thin layer that covers completely or partially the underlying structure. For example, the thin material layer 226 may completely cover the conductive features 220 and the upper surface of the dielectric layer 214 on which the conductive features 220 are positioned. In another example, the thin material layer 216 may partially cover the conductive features 210 and an underlying layer (e.g., another dielectric layer similar to the dielectric layers 214, 224) on which the conductive features 210 are positioned. The thin material layer 216 may have openings therethrough which the vias 212 extend into to make contact with the conductive features 210.

In some embodiments, the thin material layer 216 is or includes one or more dielectric materials, such as SiON, $Al_2O_3$, MgO, silicon-rich oxide (SRO), combinations thereof, or the like. Thickness of the thin material layer 216 can be in a range of about 10 nanometers (nm) to about 100 nm, such as about 30 nm. In some embodiments, the thin material layer 216 is an etch stop layer (ESL). The etch stop layer may be or include a dielectric material such as silicon carbide, silicon nitride, silicon oxy-carbide, silicon oxy-nitride, $Al_2O_3$, MgO, SRO, combinations thereof or the like. In some embodiments, the thin material layer 216 may be omitted. The thin material layer 216 may be deposited using any suitable method, such as a chemical vapor deposition (CVD) process, a plasma enhanced CVD (PECVD) process, flowable CVD (FCVD) process, the like, or a combination thereof.

In some embodiments, the thin material layer 226 is or includes one or more dielectric materials that are different than or the same as that/those of the thin material layer 216. In some embodiments, the thin material layer 226 is or includes one or more dielectric materials, such as SiON, $Al_2O_3$, MgO, SRO, combinations thereof or the like. Thickness of the thin material layer 226 can be in a range of about 10 nanometers (nm) to about 100 nm, such as about 30 nm. In some embodiments, the thin material layer 226 is a SiON layer that has thickness of about 30 nm. In some embodiments, the thin material layer 226 is a SiON layer and the thin material layer 226 is an SRO layer. Thickness of the thin material layer 226 may be different than that of the thin material layer 216. For example, the thin material layer 216 may be thicker than or thinner than the thin material layer 226. The thin material layer 226 may be deposited using any suitable method, such as a chemical vapor deposition (CVD) process, a plasma enhanced CVD (PECVD) process, flowable CVD (FCVD) process, the like, or a combination thereof.

The reflective layer 204 on the interconnect layers 202 includes reflective structures 230. The reflective structures 230 are positioned on an upper surface 224a of the dielectric layer 224. The reflective structures 230 can be or include one or more reflective materials, which can be metal, such as aluminum, silver, copper, combinations thereof (e.g., AlCu) or another suitable material having high reflectivity over the visible light spectrum. The reflective structures 230 have reflective upper surfaces 230b that are exposed for reflecting light incident on the upper surface 230a of the backplane 200. Namely, a thin material layer 232 on the reflective structures 230 may define openings therein that expose the upper surfaces 230b of the reflective structures 230. The reflective upper surfaces 230b may be highly polished, mirror-like surfaces that are beneficial to reflect the incoming light.

Each of the reflective structures 230 has width B in a first direction (e.g., the X-axis direction). Neighboring or immediately adjacent reflective structures 230 can have spacing F therebetween. The sum of the width B and the spacing F can be referred to as pitch P. In some embodiments, the pitch P is in a range of about 1 micrometer (um) to about 20 um. In some embodiments, the spacing F does not exceed about 200 nanometers (nm). For example, the spacing F can be in a range of about 10 nm to about 200 nm. The width B can be in a range of about 800 nm to about 20 um. Other widths B that exceed 20 um are also contemplated as embodiments herein.

To reduce reflection that may result from the light being incident on side walls 230s of the reflective structures 230, the reflective layer 204 includes a thin material layer 232. The thin material layer 232 is present on the side walls 230s of the reflective structures 230 and optionally on exposed regions of the upper surface 224a of the dielectric layer 224 between the reflective structures 230. Including the thin material layer 232 on the upper surface 224a can reduce reflections of the light, for example, by destructive interference. In some embodiments, the thin material layer 232 can include the same material and/or thickness as the thin material layer 226. For example, the thin material layer 232 can be a SiON layer that has thickness of about 30 nm. In some embodiments, the thin material layer 232 has a different material and/or a different thickness than the thin material layer 226. In some embodiments, the thin material layer 232 includes a SiON layer that is formed having an equal ratio (e.g., 1:1) of SiO2 and NH3. The ratio being 1:1 of $SiO_2$ and $NH_3$ can mean that for every one part of $SiO_2$, there is one part of $NH_3$ used in a reaction or deposition process to form SiON. For example, the ratio can refer to the molar ratio of precursor gases used in a chemical vapor deposition (CVD) or plasma-enhanced chemical vapor deposition (PECVD) process. A 1:1 ratio can indicate that equal amounts (on a molar basis) of silicon dioxide and ammonia are introduced into the reaction chamber to create the silicon oxynitride layer. The resulting SiON material has properties that can be selected between those of silicon dioxide ($SiO_2$) and silicon nitride ($Si_3N_4$). The exact composition and properties of the SiON film can be selected by adjusting the ratio of the precursor gases and the process conditions. In some embodiments, the ratio is different than 1:1, such as 1:1.1, 1:0.9, or another suitable ratio.

As depicted in FIG. 2A, the thin material layer 232 can have height A that extends above the upper surface 224a of the dielectric layer 224. The height A can be the same as height of the reflective structures 230. Namely, the thin material layer 232 can extend from the upper surface 224a of the dielectric layer 224 to the upper surface 230b of the reflective structures 230. In some embodiments, the height A exceeds the width B of each of the reflective structures 230.

FIG. 2B depicts a plan view of the reflective layer 204, in accordance with some embodiments. Each of the reflective structures 230 can have width B in the first direction and length L in a second direction (e.g., the Y-axis direction) that is transverse the first direction. The length L can be the same as the width B. For example, the width B can be 1 um and the length L can be 1 um. In some embodiments, the length L can exceed the width B or the width B can exceed the length L. In the plan view, the reflective structures 230 can have profile or shape that is square, rectangular (as shown), circular, ovular, triangular, pentagonal, hexagonal, octagonal, or the like. The width B can refer to a diameter of the shape in the plan view.

As depicted in FIG. 2B, the thin material layer 232 surrounds or is adjacent each of the reflective structures 230 on at least four sides. As described previously, the profile of the reflective structures 230 can have more or fewer than four sides. For example, when the reflective structures 230 have triangular shape, the thin material layer 232 can surround or be adjacent each of the reflective structures 230 on three sides. In another example, when the reflective structures 230 have circular or ovular shape, the thin material layer 232 can surround or be adjacent each of the reflective structures 230 on one side.

FIG. 2B also depicts a second spacing F2 between immediately adjacent pairs of the reflective structures 230 along the Y-axis direction. In some embodiments, the second spacing F2 is the same as the spacing F. For example, the spacing F can be about 200 nm and the second spacing F2 can be about 200 nm. In some embodiments, the second spacing F2 is different than the spacing F. The second spacing F2 can exceed the spacing F or the spacing F can exceed the second spacing F2.

FIG. 2B depicts that the reflective structures 230 are arranged in a plurality of columns and rows that extend along the Y-axis and X-axis directions, respectively. The columns can be arranged along the X-axis direction and the rows can be arranged along the Y-axis direction. Four columns and four rows are depicted in FIG. 2B, but the backplane 200 can have many more than four columns and four rows. Number of columns can be different than number of rows. For example, a resolution can refer to a number of the reflective structures 230 in each row and a number of the reflective structures 230 in each column. As one example, the resolution can be 1024×768, 1280×720, 1920×1080, 2560×1440, or the like, where the first number refers to number of columns and the second number refers to number of rows. In some embodiments, the columns and rows of the reflective structures 230 are arranged in a rectangular profile, in which the number of reflective structures 230 is uniform across all rows and/or all columns. In some embodiments, the columns and rows can be arranged in a non-rectangular profile, such as a circular profile, in which the number of reflective structures across all rows and columns increases toward a center of the backplane 200 and decreases toward a periphery of the backplane 200.

FIGS. 2C-2K are diagrammatic views that depict the backplane 200 having at least one of reflection attenuation layers 234, 236, 238, 234A, 236A, 238A arranged on the dielectric layer 224, in accordance with some embodiments. In FIGS. 2C-2K, the thin material layer 232 is omitted. The embodiments described with reference to FIGS. 2C-2K can be combined with the embodiments described with reference to FIGS. 2A and 2B. Namely, the thin material layer 232 can be included in the embodiments described with reference to FIGS. 2C-2K.

Figure 2C:
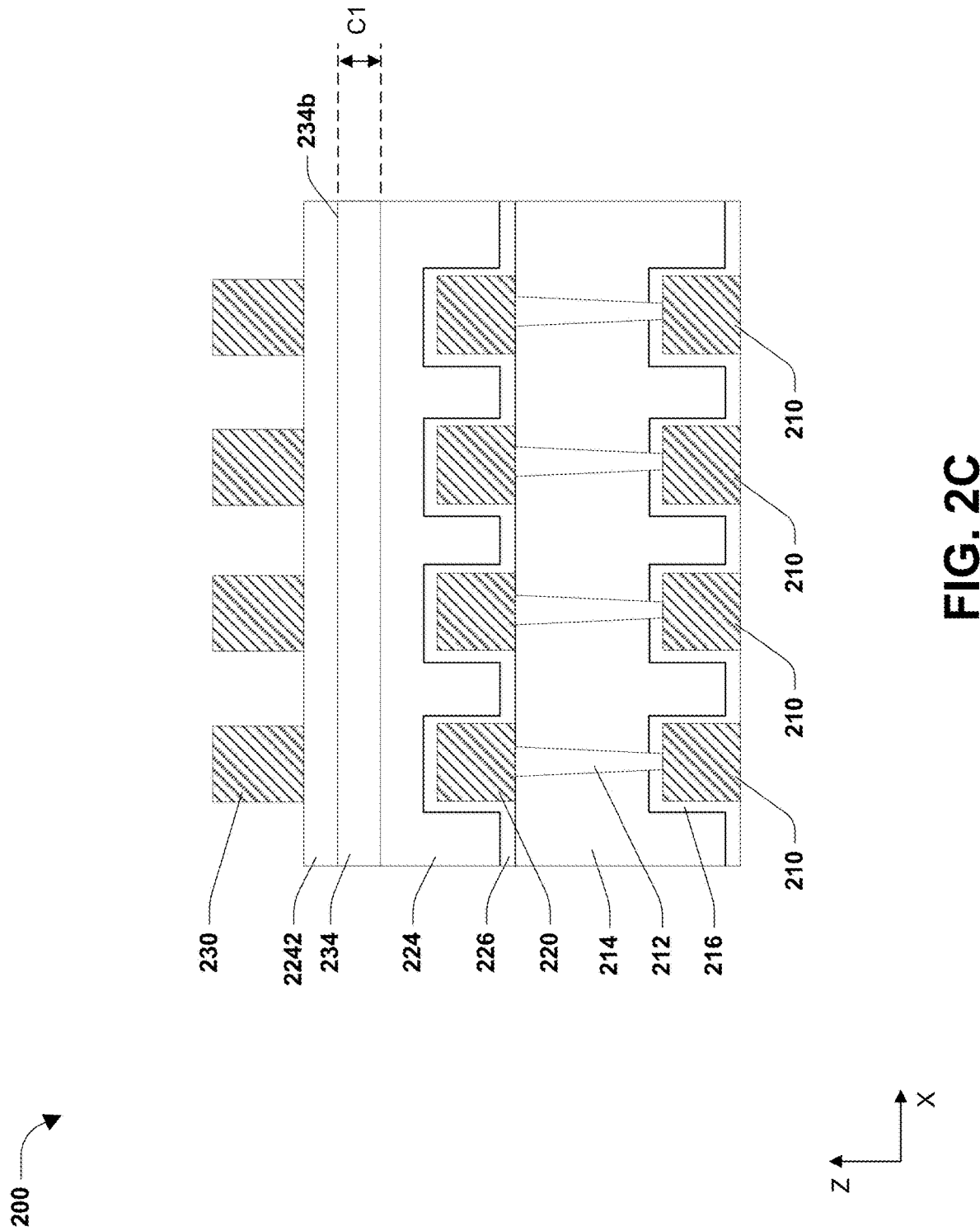
FIG. 2C illustrates a diagrammatic side view of a substrate of an LCOS display device, in accordance with some embodiments.

In FIG. 2C, a single reflection attenuation layer 234 is arranged on the dielectric layer 224 and a dielectric layer 2242 is arranged on the reflection attenuation layer 234 between the reflection attenuation layer 234 and the reflective structures 230.

The reflection attenuation layer 234 reduces incidence of light into the region(s) of the interconnect layers 202 underlying the reflection attenuation layer 234, for example, by destructive interference or another mechanism. In some embodiments, the reflection attenuation layer 234 is a different material(s) than the dielectric layer 224 and includes one or more of SiON, $Al_2O_3$, MgO, TiN, or the like. In some embodiments, the reflection attenuation layer 234 is a single layer of SiON. In some embodiments, the reflection attenuation layer 234 includes a SiON layer that is formed having an equal ratio (e.g., 1:1) of SiO2 and NH3. In some embodiments, the reflection attenuation layer 234 and the thin material layer 226 include the same or substantially the same material. The reflection attenuation layer 234 can have thickness C1 in the Z-axis direction that is in a range of about 10 nm to about 100 nm. The reflection attenuation layer 234 can be formed by CVD, LPCVD, ALD, or the like.

In some embodiments, an upper surface 234b of the reflection attenuation layer 234 has surface roughness. In some embodiments, the surface roughness is due to one or more surface treatments performed on the reflection attenuation layer 234 following formation of the reflection attenuation layer 234. For example, a brief wet etch may be performed in which the upper surface 234b is dipped for a few seconds (e.g., 0.5-5 seconds) in an etchant. As a result, roughness of the upper surface 234b may be increased. In some embodiments, arithmetic average roughness (Ra) of the upper surface 234b can be in a range of about 0.1 nm to about 0.5 nm, root mean square roughness (Rq) of the upper surface 234b can be in a range of about 0.2 nm and about 1 nm, and maximum height of profile (Rz) of the upper surface 234b can be in a range of about 1 nm to about 5 nm. The increased surface roughness of the upper surface 234b can be beneficial to attenuating or eliminating reflection of light incident thereon. For example, the increased surface roughness can increase total surface area of the upper surface 234b, which can increase interfacial area between the reflection attenuation layer 234 and the dielectric layer 2242. The increased surface roughness can modify thickness of the reflection attenuation layer 234 from substantially uniform to having a range of thicknesses. The reflection attenuation layer 234 having a range of thicknesses can increase number of wavelengths of light that can be canceled via destructive interference. For example, when the reflection attenuation layer 234 has uniform thickness that is selected to cancel a wavelength of about 600 nm, having thickness that varies by about ±2.5 nm due to surface roughness can result in cancellation of wavelengths in a range of about 585 nm to about 615 nm.

The dielectric layer 2242 can be referred to as a top or uppermost dielectric layer. In some embodiments, the dielectric layer 2242 is a single layer or multilayer including one or more of silicon oxide, tetraethyl orthosilicate (TEOS), phosphosilicate glass (PSG), borosilicate glass (BSG), boron-doped phosphosilicate glass (BPSG), fluorosilicate glass (FSG), undoped silicate glass (USG), or the like. The dielectric layer 2242 may be deposited using any suitable method, such as a chemical vapor deposition (CVD) process, a plasma enhanced CVD (PECVD) process, flowable CVD (FCVD) process, the like, or a combination thereof. In some embodiments, material(s) of the dielectric layer 2242 is/are the same as material(s) of the dielectric layer 224.

Figure 2D:
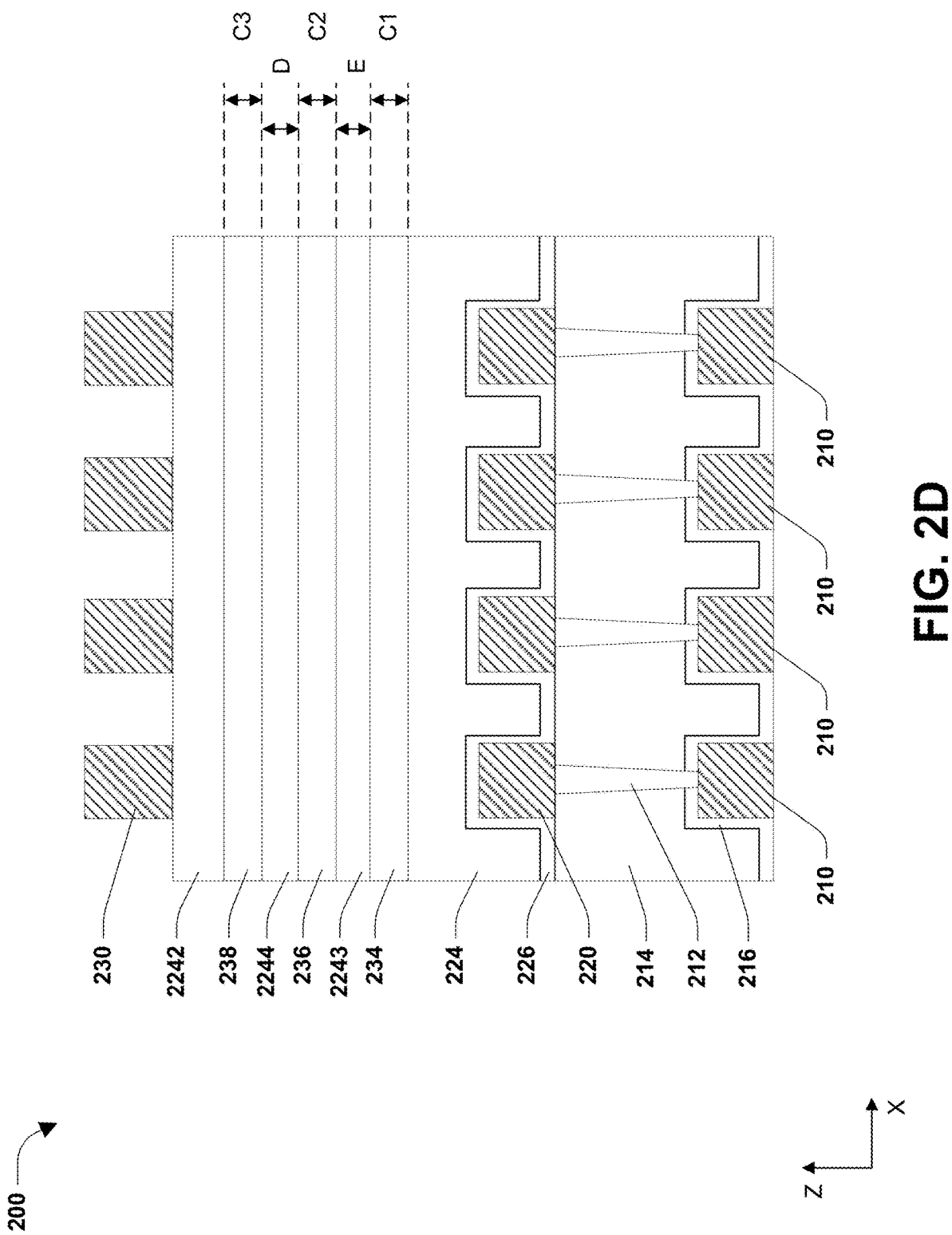
FIG. 2D illustrates a diagrammatic side view of a substrate of an LCOS display device, in accordance with some embodiments.

In FIG. 2D, the backplane 200 can include at least two reflection attenuation layers 234, 236, 238, such as first, second and third reflection attenuation layers 234, 236, 238. The first reflection attenuation layer 234 is similar in most respects to the reflection attenuation layer 234 described with reference to FIG. 2C.

The second reflection attenuation layer 236 is on the first reflection attenuation layer 234 and is separated therefrom by a first intermediate dielectric layer 2243. In some embodiments, the second reflection attenuation layer 236 is a different material(s) than the dielectric layer 224 and includes one or more of SiON, Al2O3, MgO, TiN, or the like. The second reflection attenuation layer 236 is a different material(s) than the first reflection attenuation layer 234. In some embodiments, the first reflection attenuation layer 234 is a single layer of SiON and the second reflection attenuation layer 236 is a single layer of MgO or Al$_2$O$_3$. In some embodiments, thickness C2 of the second reflection attenuation layer 236 and thickness C1 of the first reflection attenuation layer 234 are the same or substantially the same. In some embodiments, the thickness C2 is greater than or less than the thickness C1. The second reflection attenuation layer 236 can have thickness C2 in the Z-axis direction that is in a range of about 10 nm to about 100 nm. The second reflection attenuation layer 236 can be formed by CVD, LPCVD, ALD, or the like. An upper surface of the second reflection attenuation layer 236 can have surface roughness. In some embodiments, Ra of the second reflection attenuation layer 236 can be in a range of about 0.1 nm to about 0.5 nm, Rq of the second reflection attenuation layer 236 can be in a range of about 0.2 nm and about 1 nm, and Rz of the second reflection attenuation layer 236 can be in a range of about 1 nm to about 5 nm.

The second reflection attenuation layer 236 is offset from the first reflection attenuation layer 234 with the first intermediate dielectric layer 2243 positioned therebetween. The first intermediate dielectric layer 2243 has thickness E in the Z-axis direction that can be in a range of about 1 nm to about 10 nm. In some embodiments, the thickness E is less than 1 nm. In some embodiments, the first intermediate dielectric layer 2243 is a single layer or multilayer including one or more of silicon oxide, tetraethyl orthosilicate (TEOS), phosphosilicate glass (PSG), borosilicate glass (BSG), boron-doped phosphosilicate glass (BPSG), fluorosilicate glass (FSG), undoped silicate glass (USG), or the like. The first intermediate dielectric layer 2243 may be deposited using any suitable method, such as a chemical vapor deposition (CVD) process, a plasma enhanced CVD (PECVD) process, flowable CVD (FCVD) process, the like, or a combination thereof. In some embodiments, material(s) of the first intermediate dielectric layer 2243 is/are the same as material(s) of the dielectric layer 224. In some embodiments, the material(s) of the first intermediate dielectric layer 2243 and the dielectric layer 224 are different than each other.

The third reflection attenuation layer 238 is on the second reflection attenuation layer 236 and is separated therefrom by a second intermediate dielectric layer 2244. In some embodiments, the third reflection attenuation layer 238 is a different material(s) than the dielectric layer 224 and includes one or more of SiON, Al2O3, MgO, TiN, or the like. The third reflection attenuation layer 238 is a different material(s) than the first and second reflection attenuation layers 234, 236. In some embodiments, the first reflection attenuation layer 234 is a single layer of SiON, the second reflection attenuation layer 236 is a single layer of MgO, and the third reflection attenuation layer 238 is a single layer of Al$_2$O$_3$. In some embodiments, thickness C3 of the third reflection attenuation layer 238 and thicknesses C1, C2 of the first and second reflection attenuation layers 234, 236 are the same or substantially the same. In some embodiments, the thickness C2 is greater than or less than the thickness C1 and/or the thickness C3. The third reflection attenuation layer 238 can have thickness C3 in the Z-axis direction that is in a range of about 10 nm to about 100 nm. The third reflection attenuation layer 238 can be formed by CVD, LPCVD, ALD, or the like. An upper surface of the third reflection attenuation layer 238 can have surface roughness. In some embodiments, Ra of the third reflection attenuation layer 238 can be in a range of about 0.1 nm to about 0.5 nm, Rq of the third reflection attenuation layer 238 can be in a range of about 0.2 nm and about 1 nm, and Rz of the third reflection attenuation layer 238 can be in a range of about 1 nm to about 5 nm.

The third reflection attenuation layer 238 is offset from the second reflection attenuation layer 236 with the second intermediate dielectric layer 2244 positioned therebetween.

The second intermediate dielectric layer 2244 has thickness D in the Z-axis direction that can be in a range of about 1 nm to about 10 nm. In some embodiments, the thickness D is less than 1 nm. In some embodiments, the second intermediate dielectric layer 2244 is a single layer or multilayer including one or more of silicon oxide, tetraethyl orthosilicate (TEOS), phosphosilicate glass (PSG), borosilicate glass (BSG), boron-doped phosphosilicate glass (BPSG), fluorosilicate glass (FSG), undoped silicate glass (USG), or the like. The second intermediate dielectric layer 2244 may be deposited using any suitable method, such as a chemical vapor deposition (CVD) process, a plasma enhanced CVD (PECVD) process, flowable CVD (FCVD) process, the like, or a combination thereof. In some embodiments, material(s) of the second intermediate dielectric layer 2244 is/are the same as material(s) of the dielectric layer 224 and/or the first intermediate dielectric layer 2243. In some embodiments, the material(s) of one or more of the first intermediate dielectric layer 2243, the second intermediate dielectric layer 2244, and the dielectric layer 224 are different than each other.

Including at least three reflection attenuation layers 234, 236, 238 can increase number or range of wavelengths of light that can be canceled by destructive interference, which can reduce the blooming effect. In some embodiments, the number of reflection attenuation layers included between the reflective structures 230 and the dielectric layer 224 can exceed three, such as four, five or more.

In FIGS. 2E-2I, one or more reflection attenuation layers has a profile in the X-Z plane and/or the Y-Z plane that is wavy, undulating, or the like.

Figure 2E:
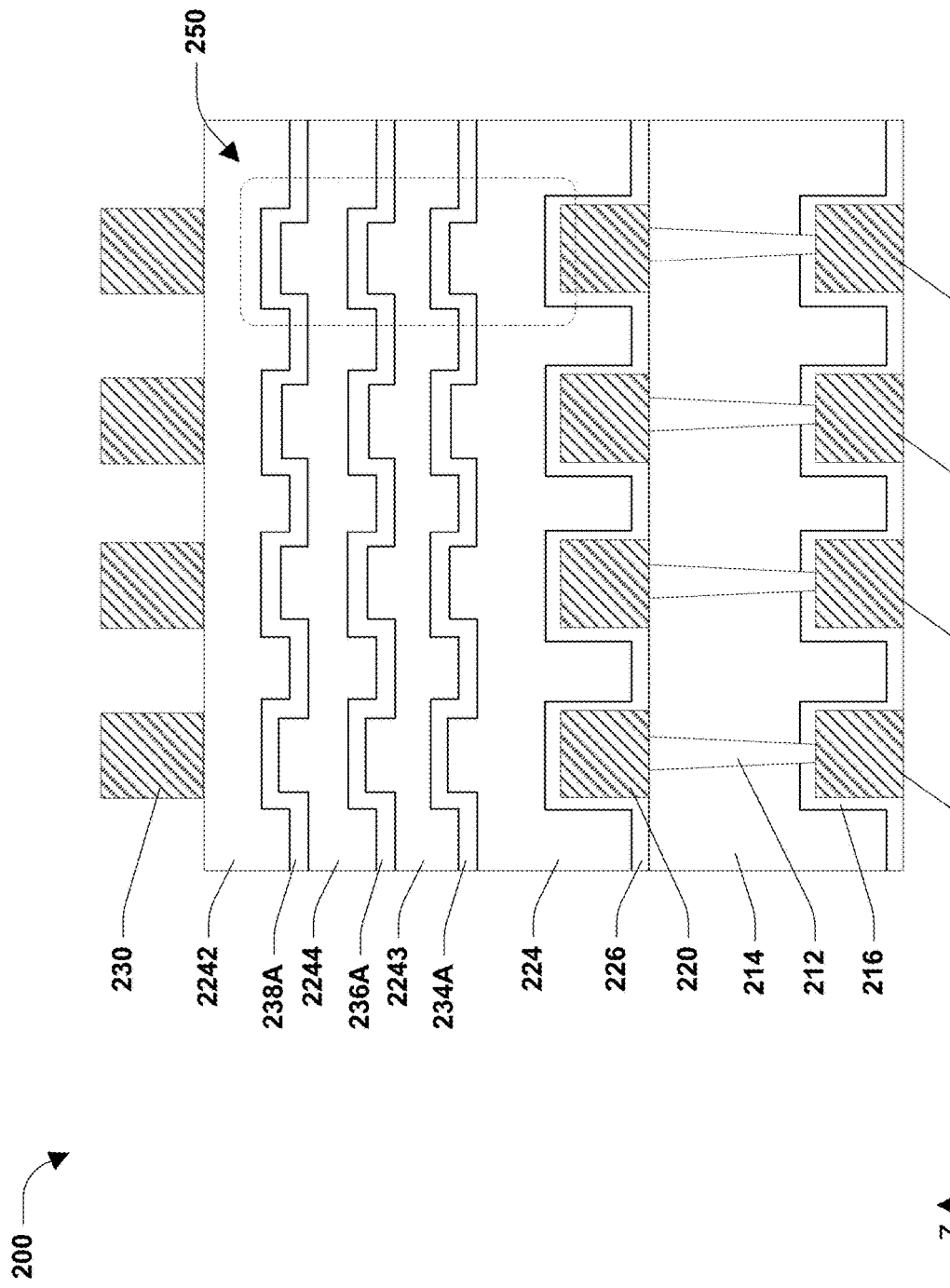
FIG. 2E illustrates a diagrammatic side view of a substrate of an LCOS display device, in accordance with some embodiments.
Figure 2F:
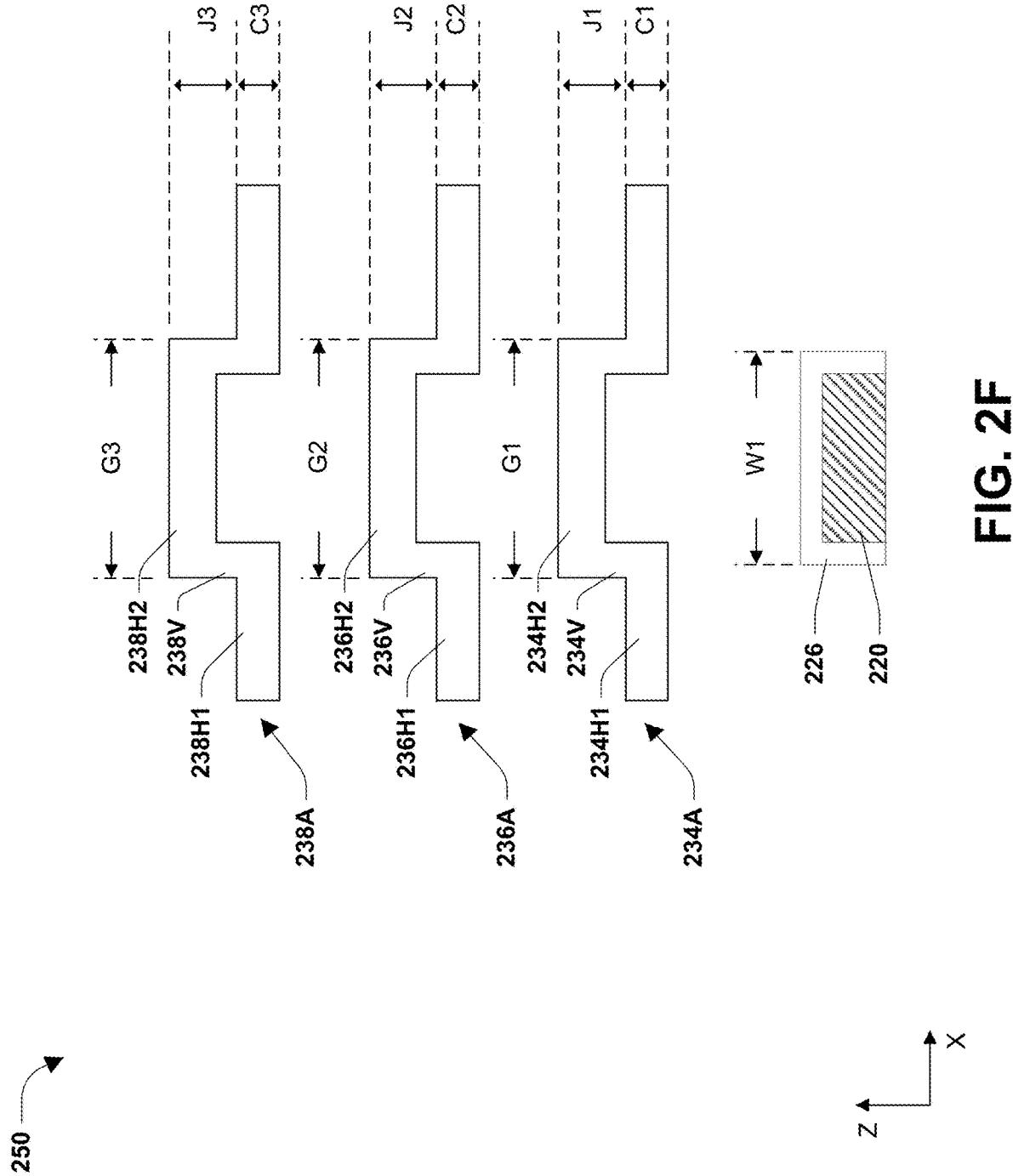
FIG. 2F illustrates a detailed view of a region of the LCOS display device of FIG. 2E, in accordance with some embodiments.

In FIGS. 2E and 2F, three reflection attenuation layers 234A, 236A, 238A each have depressions and/or elevations that can alternate along one or more of the X-axis direction and the Y-axis direction. The reflection attenuation layers 234A, 236A, 238A can be similar in most respects to the reflection attenuation layers 234, 236, 238 described with reference to FIG. 2D. For example, the reflection attenuation layer 234A can be a SiON layer, the reflection attenuation layer 236A can be an MgO layer, and the reflection attenuation layer 238A can be an $Al_2O_3$ layer.

In some embodiments, the elevations of the reflection attenuation layers 234A, 236A, 238A are aligned with the underlying conductive structures 210, 220 and/or the thin material layers 216, 226, as depicted in FIG. 2E.

FIG. 2F depicts a region 250 of FIG. 2E in detail. Each of the reflection attenuation layers 234A, 236A, 238A has horizontal portions and vertical portions. For example, the reflection attenuation layer 234A has horizontal portions 234H1, 234H2 and a vertical portion 234V. The horizontal portion 234H2 is over the horizontal portion 234H1. The horizontal portions 234H2 have width G1 in the X-axis direction and/or the Y-axis direction. In some embodiments, the width G1 exceeds width W1 of a portion of the thin material layer 226 that overlies the conductive structure 220. For example, in the X-axis direction and/or the Y-axis direction, the horizontal portion 234H2 can completely overlap the portion of the thin material layer 226 that overlies the conductive structure 220.

The vertical portion 234V extends from a side of the horizontal portion 234H2 to a side of the horizontal portion 234H1. In some embodiments, the vertical portion 234V extends at a taper angle that is offset from vertical. For example, the vertical portion 234V that extends vertically can extend at an angle of 90° relative to the horizontal portion 234H1, and the vertical portion 234V that extends at a taper angle offset from vertical can extend at an angle that exceeds 90°, such as an angle in a range of about 91° to about 135°, or another suitable angle.

An upper surface of the horizontal portion 234H2 may be offset from an upper surface of the horizontal portion 234H1 by a distance J1. In some embodiments, the distance J1 is in a range of about 1 nm to about 10 nm. In some embodiments, the distance J1 exceeds 10 nm. In some embodiments, the distance J1 exceeds the thickness C1 of the reflection attenuation layer 234A. The thickness C1 can be any of the thicknesses for the thickness C1 discussed with reference to FIG. 2D.

The reflection attenuation layer 236A has horizontal portions 236H1, 236H2 and a vertical portion 236V. The horizontal portion 236H2 is over the horizontal portion 236H1. The horizontal portions 236H2 have width G2 in the X-axis direction and/or the Y-axis direction. In some embodiments, the width G2 exceeds the width W1 of the portion of the thin material layer 226 that overlies the conductive structure 220. For example, in the X-axis direction and/or the Y-axis direction, the horizontal portion 236H2 can completely overlap the portion of the thin material layer 226 that overlies the conductive structure 220. In some embodiments, the width G2 is the same as the width G1. In some embodiments, the width G2 exceeds or is less than the width G1.

The vertical portion 236V extends from a side of the horizontal portion 236H2 to a side of the horizontal portion 236H1. In some embodiments, the vertical portion 236V extends at a taper angle that is offset from vertical. For example, the vertical portion 236V that extends vertically can extend at an angle of 90° relative to the horizontal portion 236H1, and the vertical portion 236V that extends at a taper angle offset from vertical can extend at an angle that exceeds 90°, such as an angle in a range of about 91° to about 135°, or another suitable angle.

An upper surface of the horizontal portion 236H2 may be offset from an upper surface of the horizontal portion 236H1 by a distance J2. In some embodiments, the distance J2 is in a range of about 1 nm to about 10 nm. In some embodiments, the distance J2 exceeds 10 nm. In some embodiments, the distance J2 exceeds the thickness C2 of the reflection attenuation layer 236A. The thickness C2 can be any of the thicknesses for the thickness C2 discussed with reference to FIG. 2D. In some embodiments, the distance J2 is the same as the distance J1. In some embodiments, the distance J2 exceeds or is less than the distance J1.

The reflection attenuation layer 238A has horizontal portions 238H1, 238H2 and a vertical portion 238V. The horizontal portion 238H2 is over the horizontal portion 238H1. The horizontal portions 238H2 have width G3 in the X-axis direction and/or the Y-axis direction. In some embodiments, the width G3 exceeds the width W1 of the portion of the thin material layer 226 that overlies the conductive structure 220. For example, in the X-axis direction and/or the Y-axis direction, the horizontal portion 238H2 can completely overlap the portion of the thin material layer 226 that overlies the conductive structure 220. In some embodiments, the width G3 is the same as the width G1 and/or the width G2. In some embodiments, the width G3 exceeds or is less than the width G1 and/or the width G2.

The vertical portion 238V extends from a side of the horizontal portion 238H2 to a side of the horizontal portion 238H1. In some embodiments, the vertical portion 238V extends at a taper angle that is offset from vertical. For example, the vertical portion 238V that extends vertically can extend at an angle of 90° relative to the horizontal portion 238H1, and the vertical portion 238V that extends at a taper angle offset from vertical can extend at an angle that exceeds 90°, such as an angle in a range of about 91° to about 135°, or another suitable angle.

An upper surface of the horizontal portion 238H2 may be offset from an upper surface of the horizontal portion 238H1 by a distance J3. In some embodiments, the distance J3 is in a range of about 1 nm to about 10 nm. In some embodiments, the distance J3 exceeds 10 nm. In some embodiments, the distance J3 exceeds the thickness C3 of the reflection attenuation layer 238A. The thickness C3 can be any of the thicknesses for the thickness C3 discussed with reference to FIG. 2D. In some embodiments, the distance J3 is the same as the distance J1 and/or the distance J2. In some embodiments, the distance J3 exceeds or is less than the distance J1 and/or the distance J2.

Figure 2G:
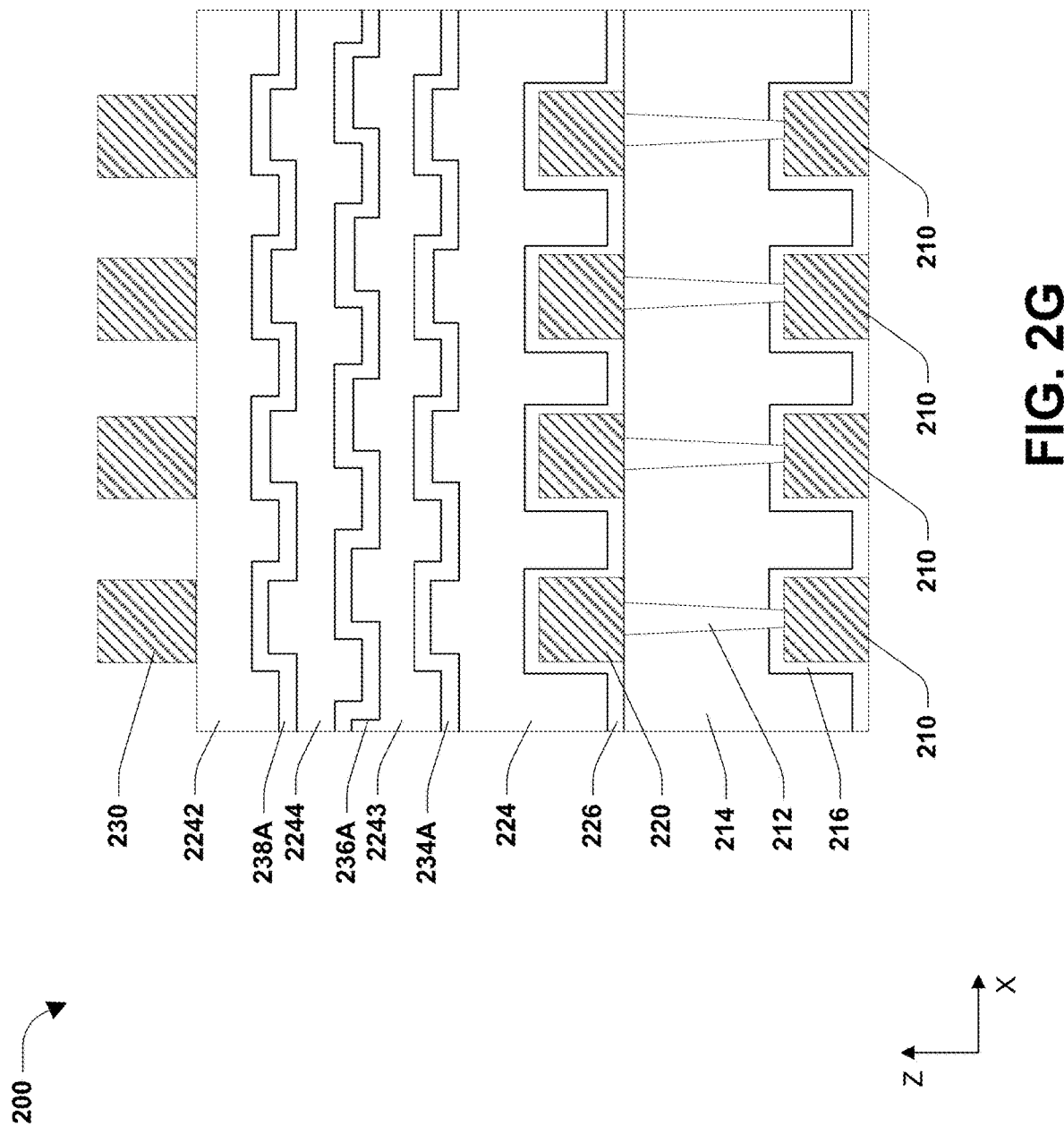
FIG. 2G illustrates a diagrammatic side view of a substrate of an LCOS display device, in accordance with some embodiments.

In FIG. 2G, one or more of the reflection attenuation layers 234A, 236A, 238A is not fully aligned with the underlying conductive structure(s) 210, 220. For example, as depicted in FIG. 2G, the reflection attenuation layer 236A has elevations that partially cover the conductive structure(s) 210, 220. In some embodiments, each of the reflection attenuation layers 234A, 236A, 238A has elevations and depressions that alternate in a periodic manner. Periodicity of the reflection attenuation layers 234A, 236A, 238A may be the same as each other. Phase of one or more of the reflection attenuation layers 234A, 236A, 238A may be offset or shifted from phase of others of the reflection attenuation layers 234A, 236A, 238A. In the example embodiment depicted in FIG. 2G, phase of the reflection attenuation layer 236A leads phase of the reflection attenuation layers 234A, 238A by a quarter period or 90°. Namely, the respective centers of the elevations of the reflection attenuation layer 236A may substantially overlap and/or be aligned with the corresponding vertical portions 234V, 238V of the reflection attenuation layers 234A, 238A.

Formation of the elevations and depressions may include formation of a photomask, patterning the photomask to form openings therein, and etching through the openings to form depressions in the underlying layer (e.g., the dielectric layer 224). Then, the corresponding reflection attenuation layer, such as the reflection attenuation layer 234A is formed on the patterned underlying layer, such as the dielectric layer 224 via one of the processes described with reference to FIGS. 2C and 2D.

Figure 2H:
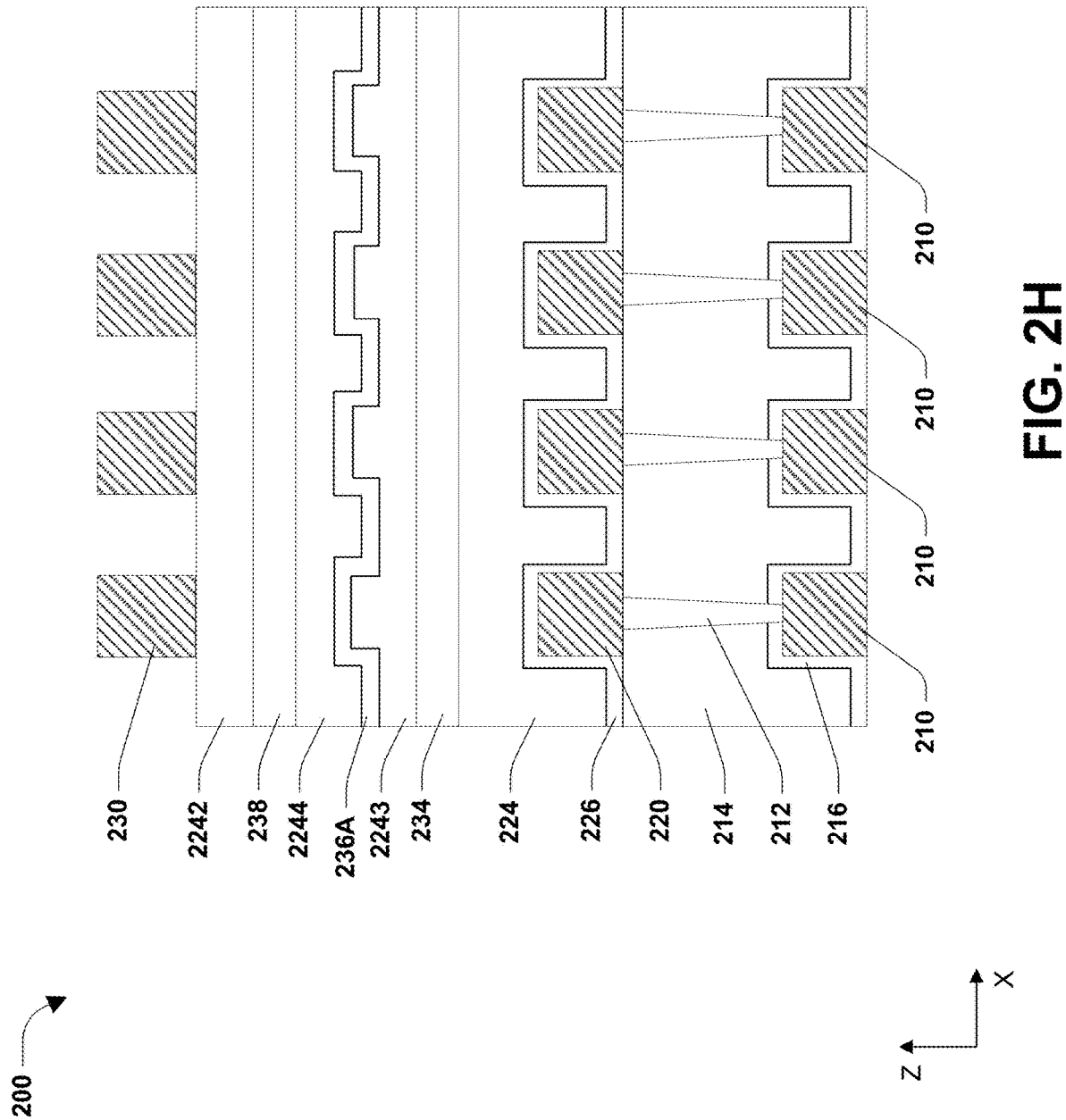
FIG. 2H illustrates a diagrammatic side view of a substrate of an LCOS display device, in accordance with some embodiments.

In FIG. 2H, one of the reflection attenuation layers (e.g., the reflection attenuation layer 236A) has elevations and depressions as described with reference to FIG. 2G, and one or more of the reflection attenuation layers (e.g., the reflection attenuation layers 234, 238) are substantially flat. FIG. 2H depicts an embodiment in which the backplane 200 includes the reflection attenuation layer 236A having the elevations and depressions and the reflection attenuation layers 234, 238 that are substantially flat. In some embodiments, the backplane 200 can include one or more of the reflection attenuation layers 234A, 236A, 238A and one or more of the reflection attenuation layers 234, 236, 238.

Figure 2I:
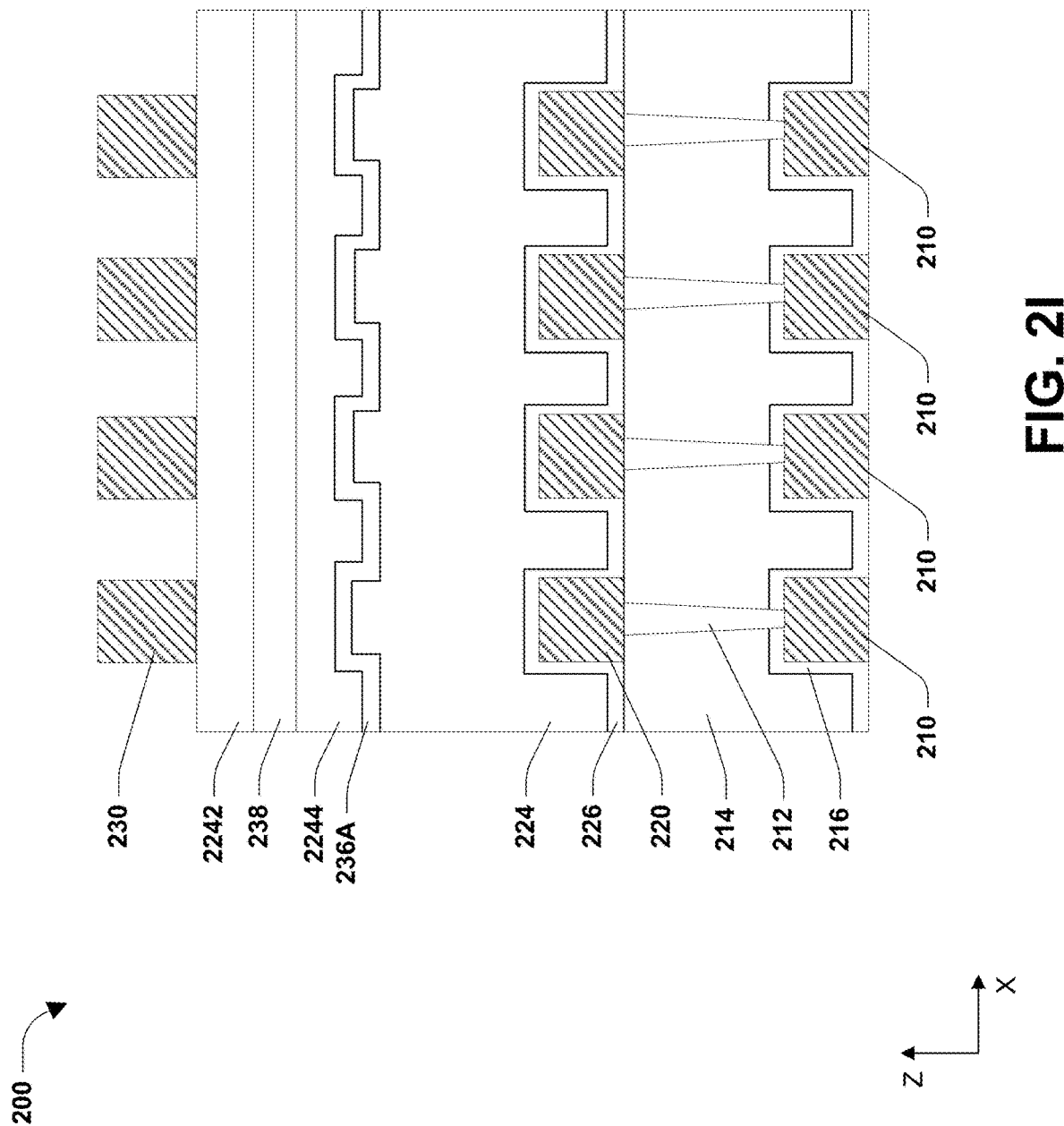
FIG. 2I illustrates a diagrammatic side view of a substrate of an LCOS display device, in accordance with some embodiments.

In FIG. 2I, in accordance with some embodiments, one or more of the reflection attenuation layers 234, 234A, 236, 236A, 238, 238A is omitted. For example, as depicted in FIG. 2I, the backplane 200 includes the reflection attenuation layer 236A and the reflection attenuation layer 238 and the reflection attenuation layer 234 is omitted. In some embodiments, the reflection attenuation layer 234 or the reflection attenuation layer 234A is included and one or more of the reflection attenuation layers 236, 236A, 238, 238A is omitted.

Figure 2J:
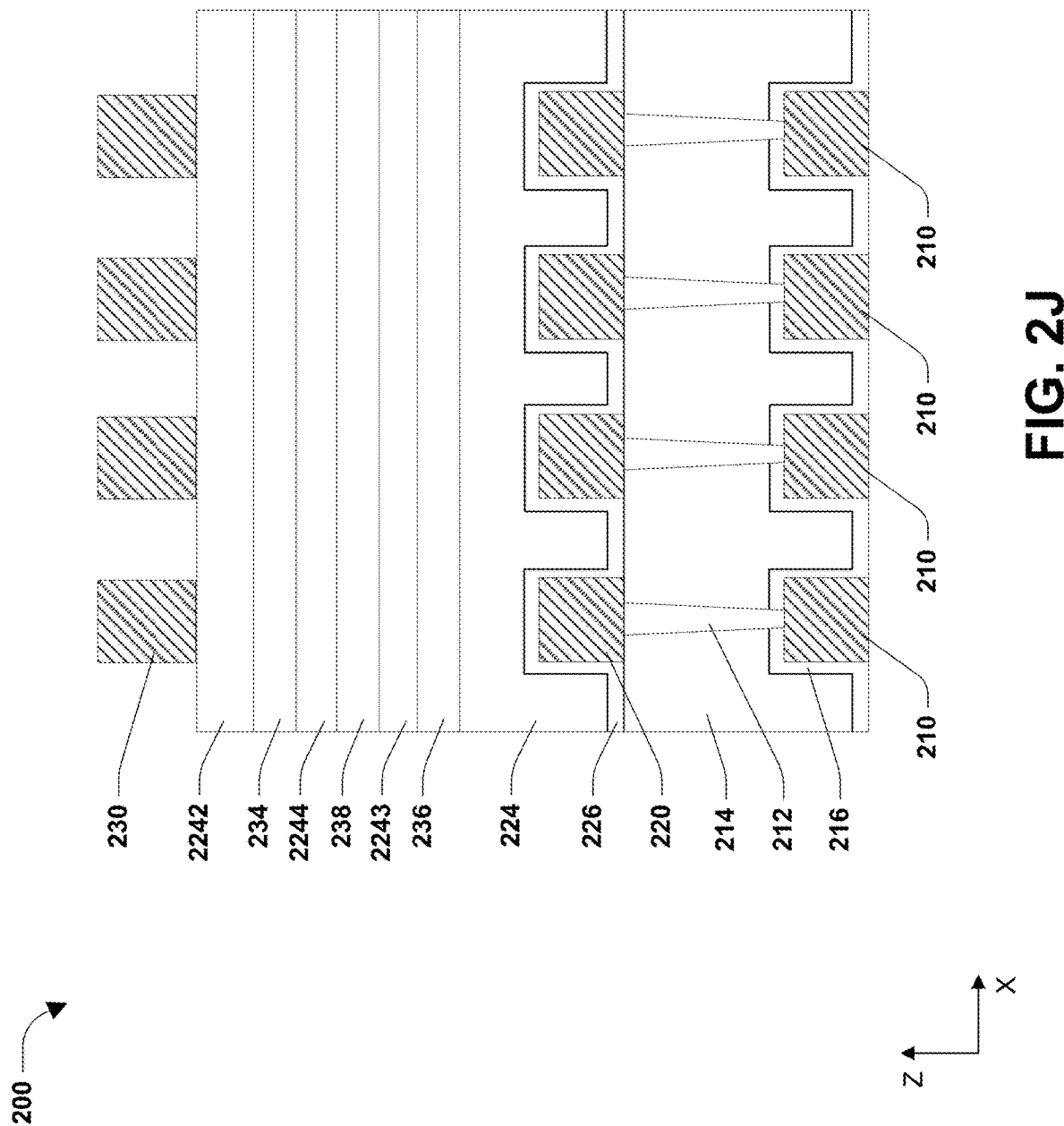
FIG. 2J illustrates a diagrammatic side view of a substrate of an LCOS display device, in accordance with some embodiments.

In FIG. 2J, order of the reflection attenuation layers 234, 236, 238 and/or the reflection attenuation layers 234A, 236A, 238A may be different than that described with reference to FIGS. 2D and 2E. For example, in FIG. 2D, the reflection attenuation layers 234, 236, 238 are arranged such that the reflection attenuation layer 236 is over the reflection attenuation layer 234, and the reflection attenuation layer 238 is over the reflection attenuation layer 236. In some embodiments, the reflection attenuation layer 238 is over the reflection attenuation layer 236 and the reflection attenuation layer 234 is over the reflection attenuation layer 238. For example, in some embodiments, the reflection attenuation layer 236 is an MgO layer, the reflection attenuation layer 238 over the reflection attenuation layer 236 is an $Al_2O_3$ layer, and the reflection attenuation layer 234 over the reflection attenuation layer 238 is an SiON layer. In some embodiments, the SiON layer (e.g., the reflection attenuation layer 234) may be between the MgO layer (e.g., the reflection attenuation layer 236) and the $Al_2O_3$ layer (e.g., the reflection attenuation layer 238).

Figure 2K:
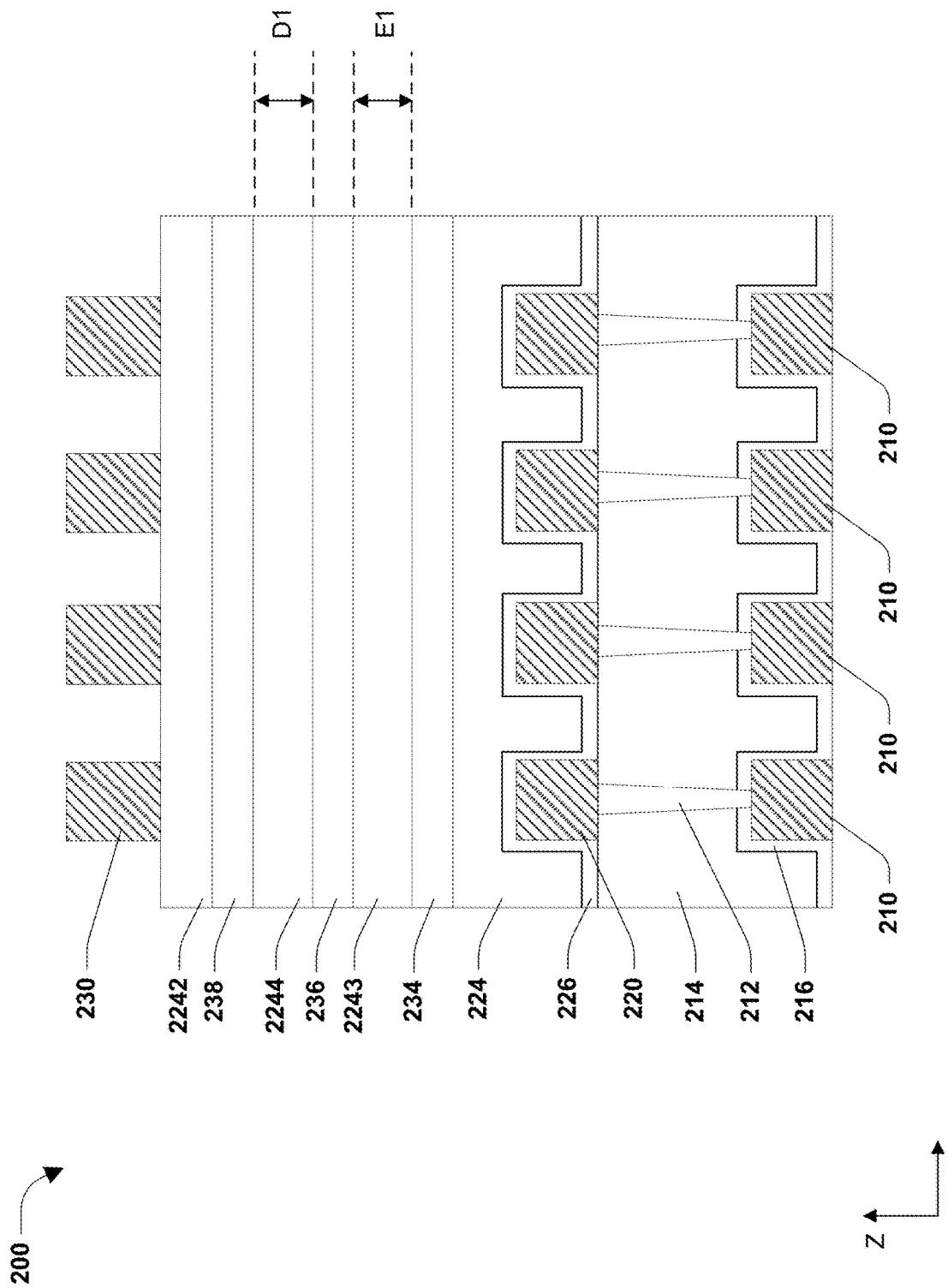
FIG. 2K illustrates a diagrammatic side view of a substrate of an LCOS display device, in accordance with some embodiments.

In FIG. 2K, instead of the distances D, E described with reference to FIG. 2D, the reflection attenuation layers 234, 236, 238 can be separated from each other by distances D1, E1, as shown. Namely, the reflection attenuation layer 234 is separated from the reflection attenuation layer 236 by the distance E1 and the reflection attenuation layer 236 is separated from the reflection attenuation layer 238 by the distance D1. In some embodiments, the distances D1, E1 each exceed 10 nm, exceed about 20 nm, exceed about 30 nm, or another suitable value. In some embodiments, each of the distances D1, E1 is in a range of about 15 nm to about 100 nm, such as about 15 nm to about 50 nm.

FIGS. 3A-5D are diagrammatic views of a backplane 200 at intermediate stages of fabrication in accordance with some embodiments. FIGS. 3A-5D are described with reference to FIG. 6, which is a flow diagram of a method 600 of forming a backplane 200 in accordance with some embodiments. Although the cross-sectional views shown in FIGS. 3A-5D are described with reference to a method, it will be appreciated that the structures shown in FIGS. 3A-5D are not limited to the method but rather may stand alone separate of the method. Furthermore, although FIGS. 3A-5D are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

Figure 3A:
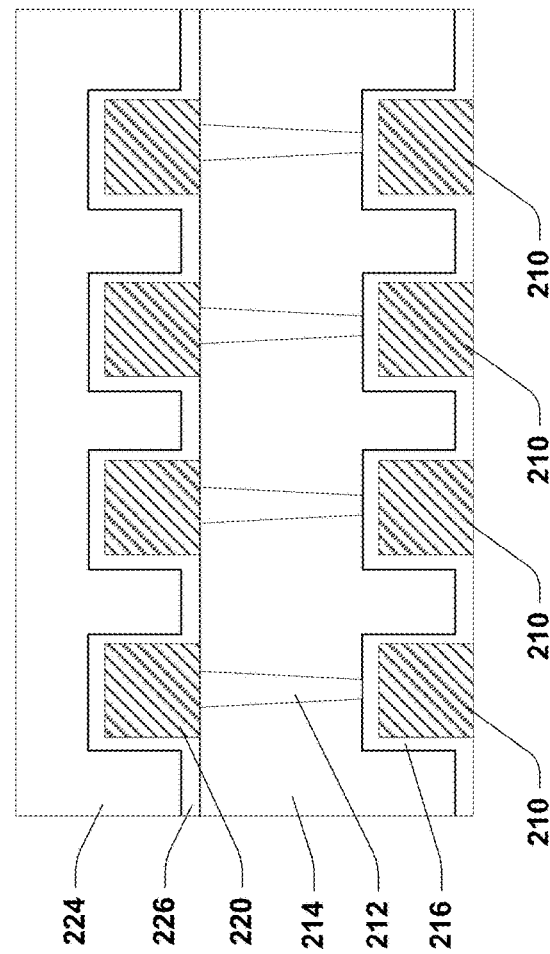

In FIG. 3A, the backplane 200 includes the conductive structures 210, 212, 220, the dielectric layers 214, 224 and the thin material layers 216, 226 described with reference to FIGS. 2A-2K.

Figure 3B:
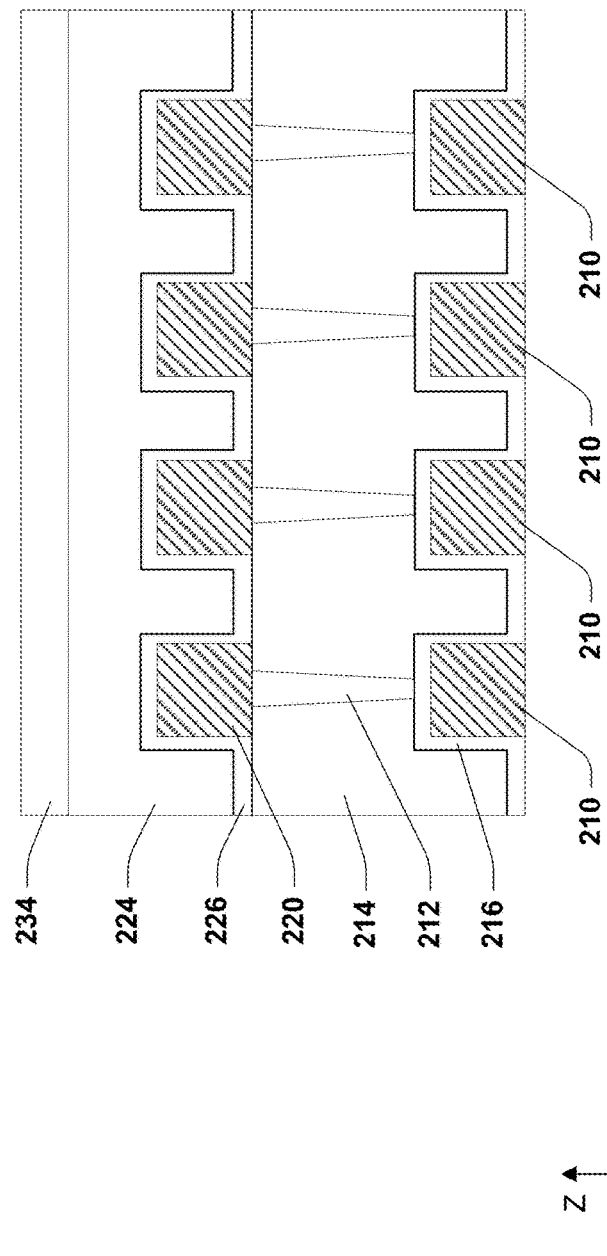
Figure 6:
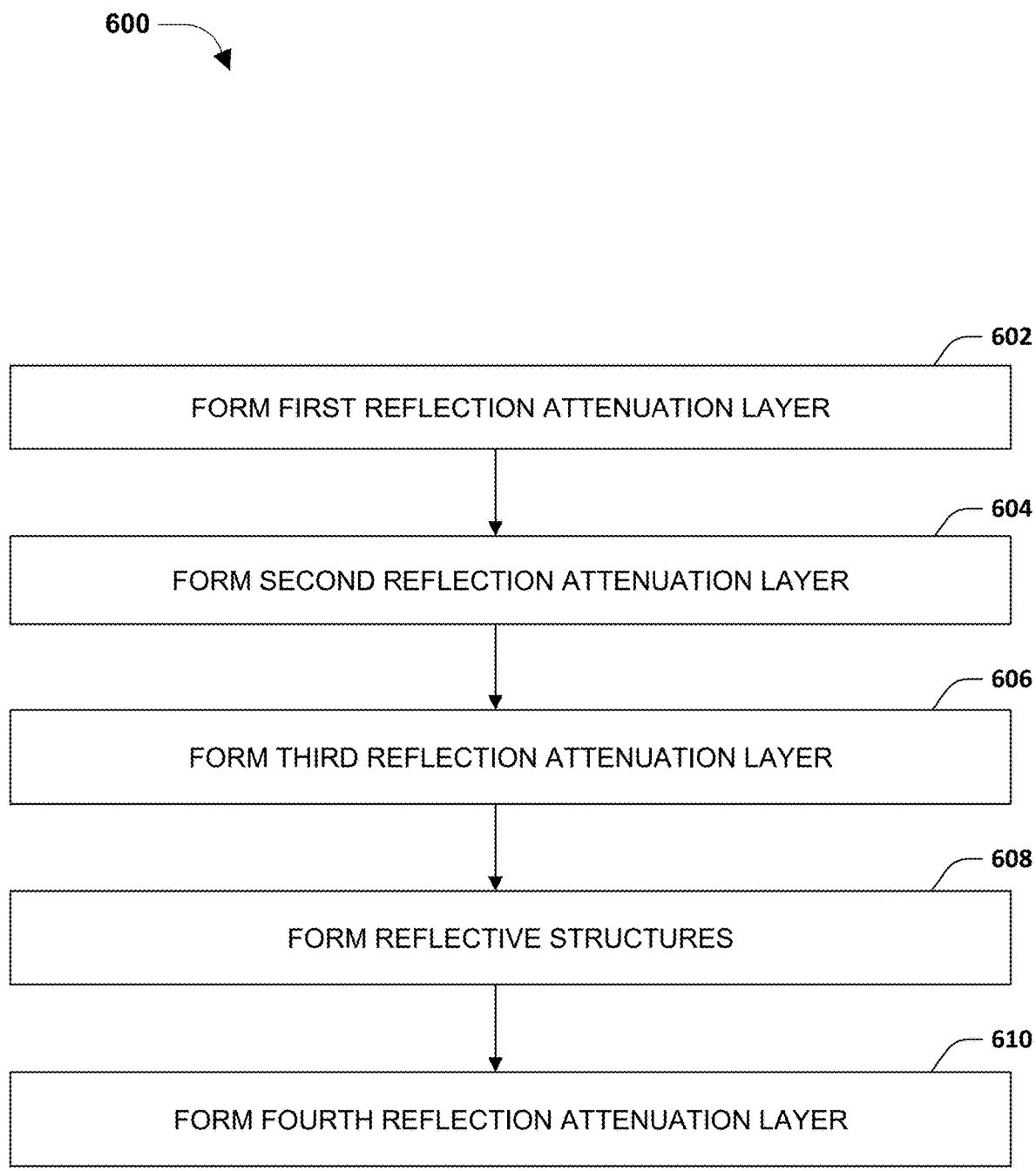
FIG. 6 is a flow diagram illustrating a method, in accordance with some embodiments.

In FIG. 3B, the first reflection attenuation layer 234 is formed on the dielectric layer 224, corresponding to act 602 of FIG. 6. The first reflection attenuation layer 234 can be formed by CVD, LPCVD, ALD, or the like, as described with reference to FIGS. 2C and 2D. The first reflection attenuation layer 234 can have the thickness C1 and material(s) described with reference to FIGS. 2C and 2D.

Figure 3C:
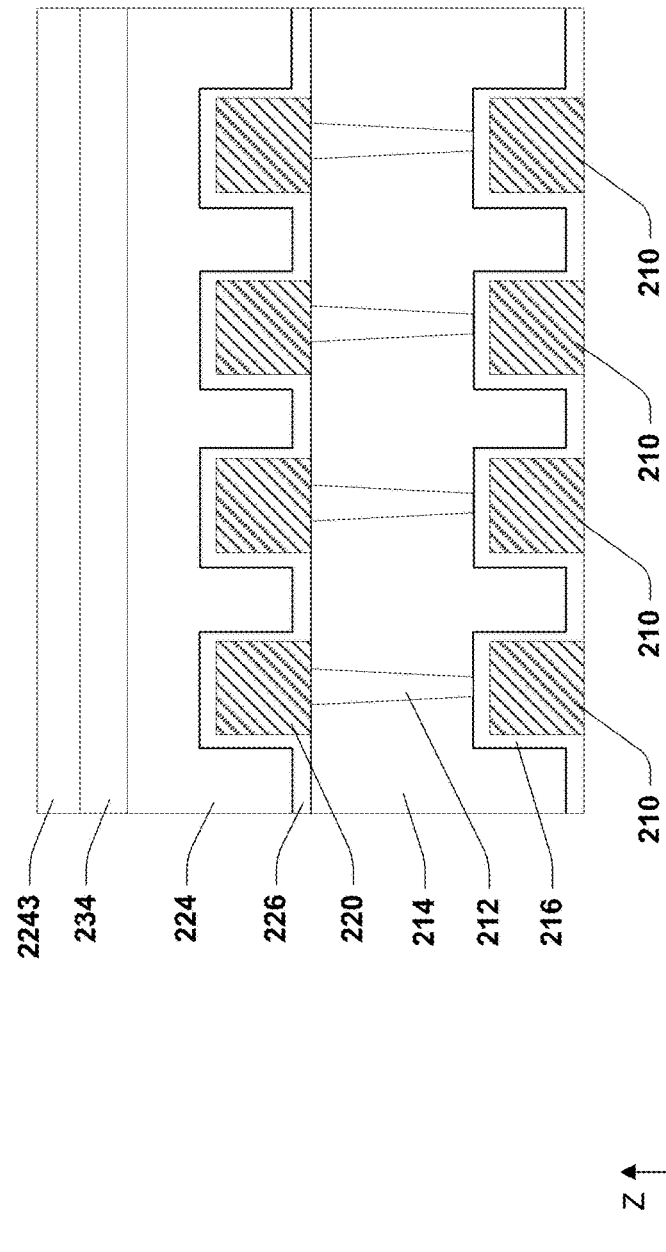

In FIG. 3C, the first intermediate dielectric layer 2243 is formed on the first reflection attenuation layer 234. The first intermediate dielectric layer 2243 can have the thickness E or the thickness E1 and can be or include any of the materials described with reference to FIGS. 2C and 2D. The first intermediate dielectric layer 2243 may be deposited using any suitable method, such as a chemical vapor deposition (CVD) process, a plasma enhanced CVD (PECVD) process, flowable CVD (FCVD) process, the like, or a combination thereof.

Figure 3D:
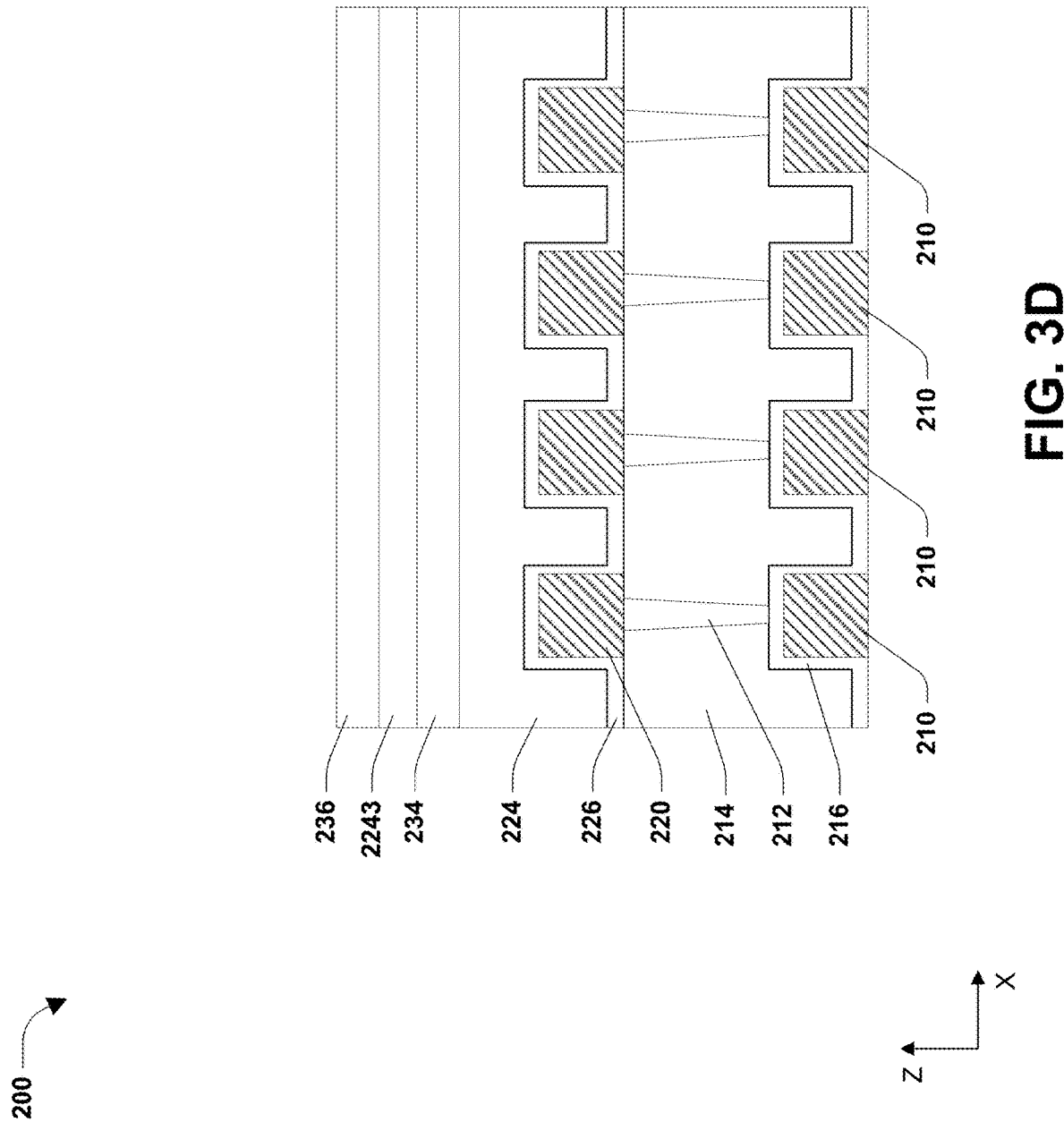

In FIG. 3D, the second reflection attenuation layer 236 is formed on the first intermediate dielectric layer 2243, corresponding to act 604 of FIG. 6. The second reflection attenuation layer 236 can be formed by CVD, LPCVD, ALD, or the like, as described with reference to FIGS. 2C and 2D. The second reflection attenuation layer 236 can have the thickness C2 and material(s) described with reference to FIGS. 2C and 2D.

In FIG. 3E, the second intermediate dielectric layer 2244 is formed on the second reflection attenuation layer 236. The second intermediate dielectric layer 2244 can have the thickness D or the thickness D1 and can be or include any of the materials described with reference to FIGS. 2C and 2D. The second intermediate dielectric layer 2244 may be deposited using any suitable method, such as a chemical vapor deposition (CVD) process, a plasma enhanced CVD (PECVD) process, flowable CVD (FCVD) process, the like, or a combination thereof.

Figure 3F:
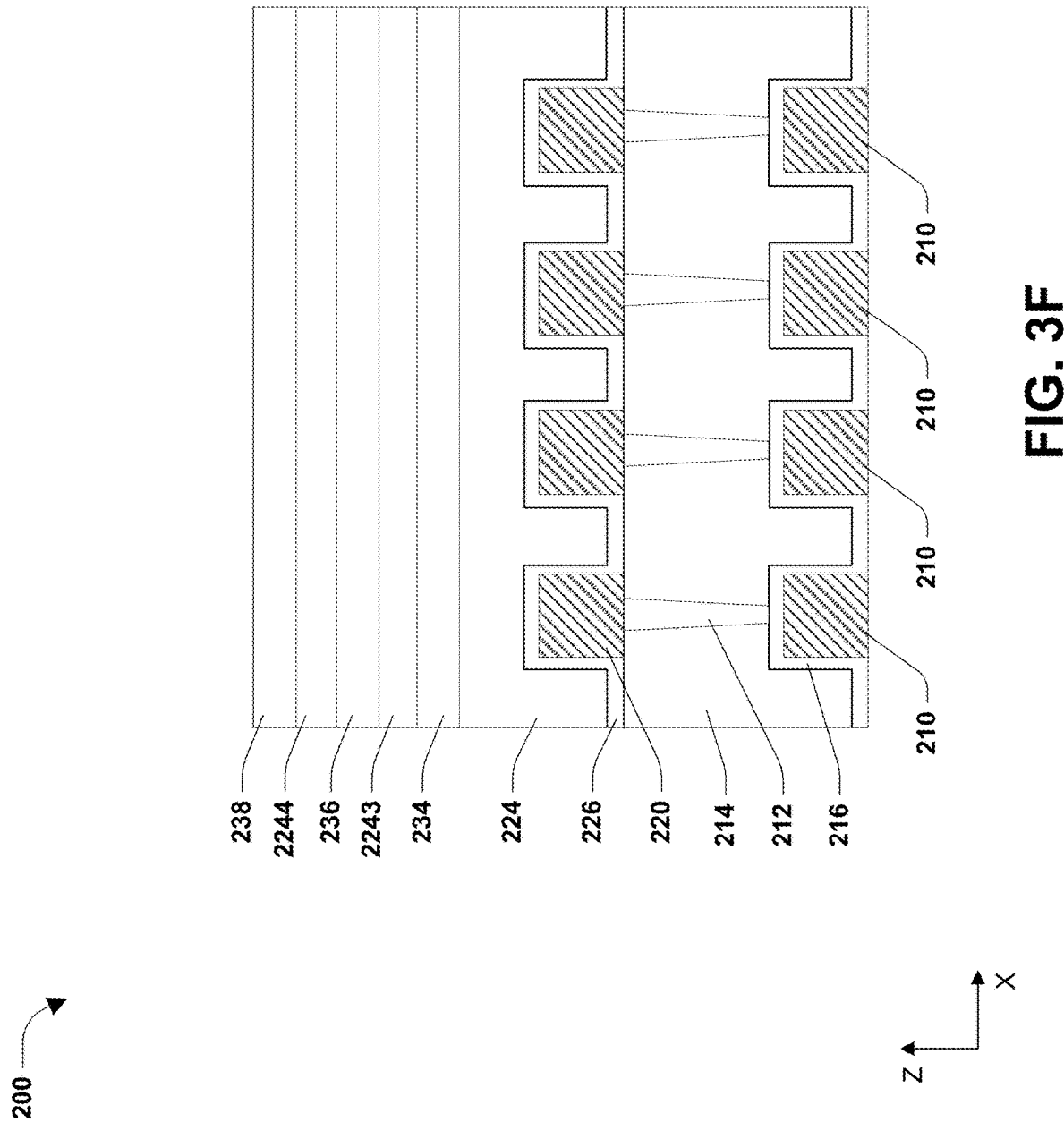

In FIG. 3F, the third reflection attenuation layer 238 is formed on the first intermediate dielectric layer 2243, corresponding to act 606 of FIG. 6. The third reflection attenuation layer 238 can be formed by CVD, LPCVD, ALD, or the like, as described with reference to FIGS. 2C and 2D. The third reflection attenuation layer 238 can have the thickness C2 and material(s) described with reference to FIGS. 2C and 2D.

In FIG. 3G, the dielectric layer 2242 (or "top dielectric layer 2242") is formed on the third reflection attenuation layer 238. The top dielectric layer 2242 can be or include any of the materials described with reference to FIGS. 2C and 2D. The top dielectric layer 2242 may be deposited using any suitable method, such as a chemical vapor deposition (CVD) process, a plasma enhanced CVD (PECVD) process, flowable CVD (FCVD) process, the like, or a combination thereof.

Figure 3H:
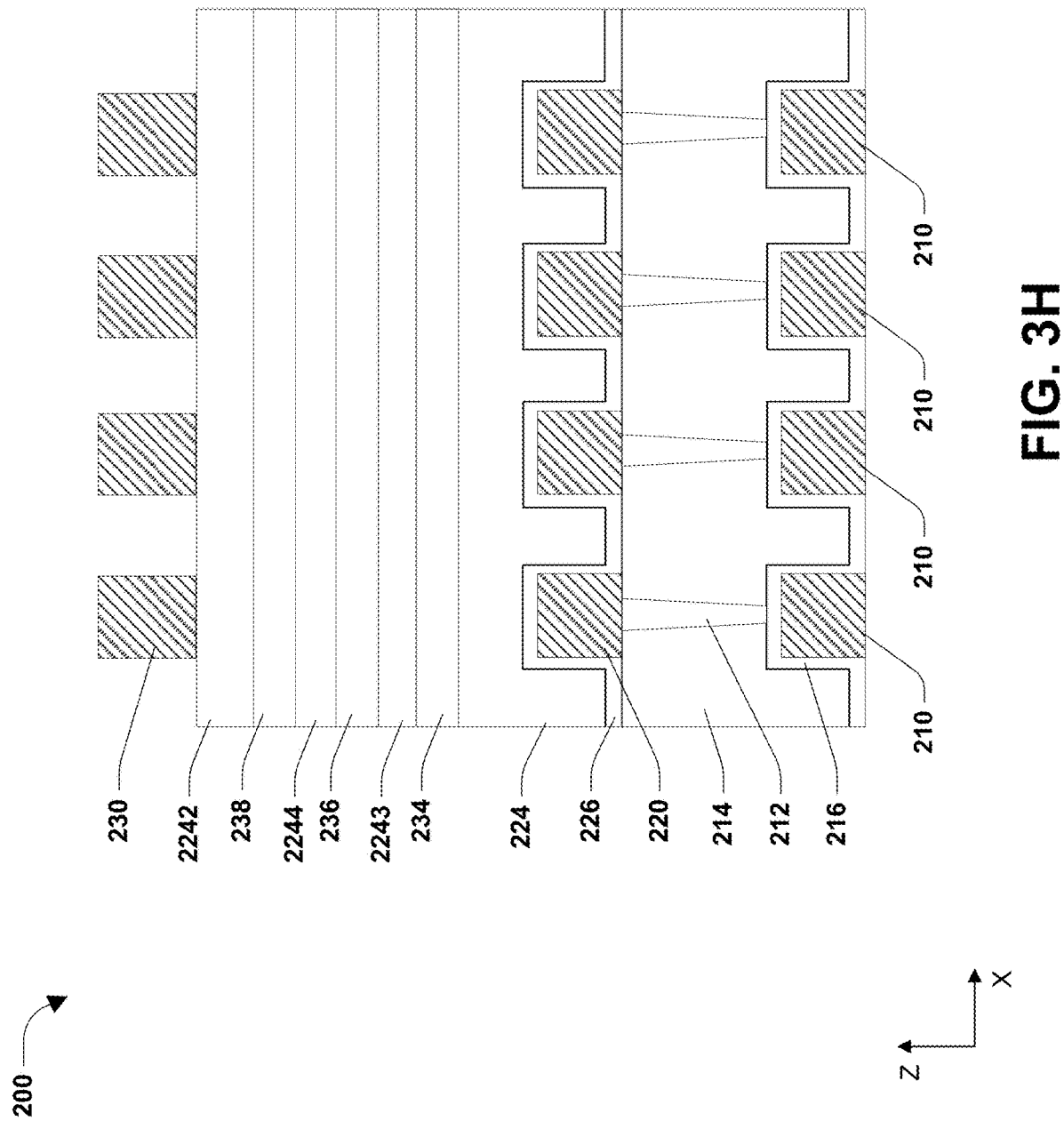

In FIG. 3H, the reflective structures 230 are formed on the top dielectric layer 2242, corresponding to act 608 of FIG. 6. As described with reference to FIGS. 2C and 2D, the reflective structures 230 can include aluminum, copper, silver, AlCu, or the like. The reflective structures 230 can be formed by a suitable process, which can include a photoresist lift off process. In some embodiments, the reflective structures 230 can be formed by a process that includes (i) forming a dielectric layer, (ii) patterning the dielectric layer to form openings, (iii) forming the reflective structures 230 in the openings and (iv) removing the dielectric layer between the reflective structures 230.

Following formation of the reflective structures 230, other structures of the display device 100 may be formed sequentially on the backplane 200. For example, the lower alignment layer 120 may be formed on the backplane 200, the liquid crystal layer 130 may be formed on the first alignment layer 120, the second or upper alignment layer 140 may be formed on the liquid crystal layer 130, the electrode layer 150 may be formed on the second alignment layer 140, and the cover layer 160 may be attached to the electrode layer 150.

In some embodiments, the thin material layer 232 which can be, and referred to as, a fourth reflection attenuation layer 232 is formed on the sidewalls of the reflective structures 230 and exposed surfaces of the top dielectric layer 2242, corresponding to act 610 of FIG. 6. The thin material layer 232 can be formed in a manner similar in most respects to that described with reference to FIGS. 2A and 2B.

FIGS. 4A-4D are diagrammatic views that depict formation of the reflection attenuation layer 234A having elevations and depressions as described with reference to FIGS. 2E-2I.

Figure 4A:
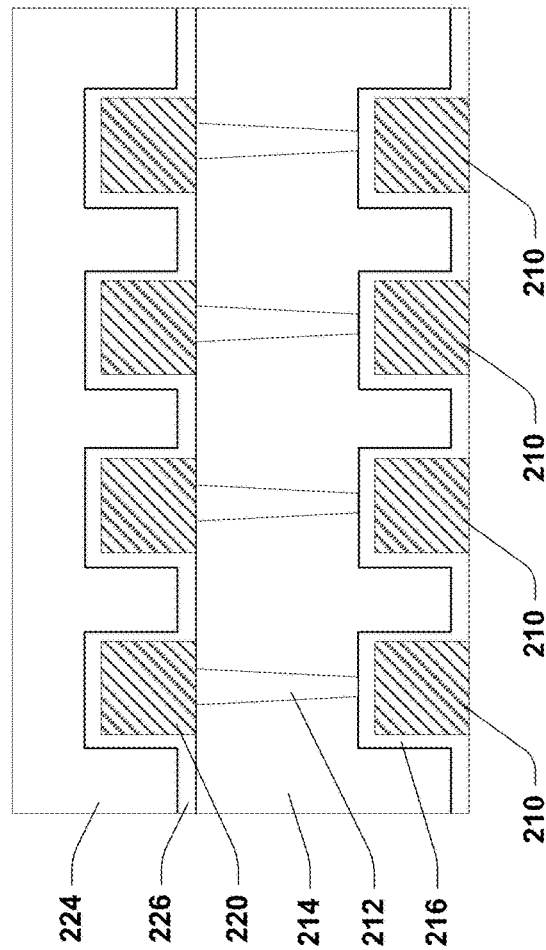
FIGS. 4A, 4B, 4C, and 4D illustrate diagrammatic side views of a display device at intermediate steps of fabrication, in accordance with some embodiments.

In FIG. 4A, the backplane 200 includes the conductive structures 210, 212, 220, the dielectric layers 214, 224 and the thin material layers 216, 226 described with reference to FIGS. 2A-2K.

Figure 4B:
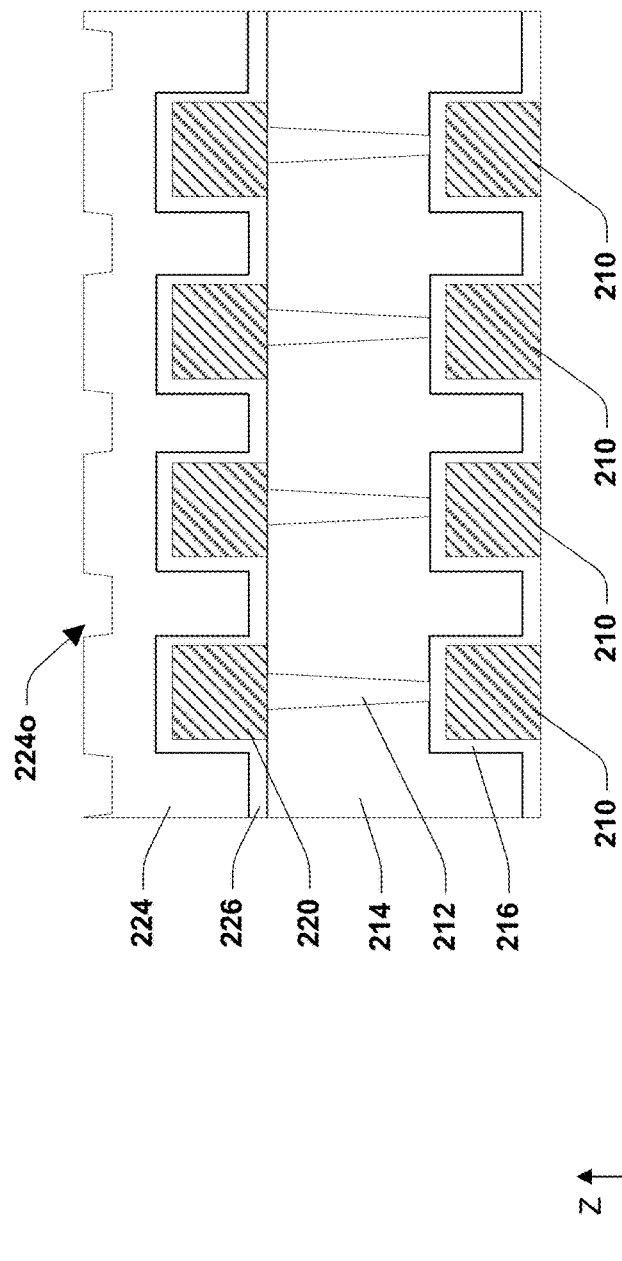

In FIG. 4B, openings 224o are formed in the dielectric layer 224. The openings 224o may be formed by a suitable etching operation, which can include forming a mask on the dielectric layer 224, forming openings in the mask via a patterning process (e.g., photolithography), etching the dielectric layer 224 through the openings in the mask, and removing the mask. In some embodiments, the openings 224o have tapered sidewalls, as shown. In some embodiments, the sidewalls of the openings 224o are substantially vertical. The openings 224o can be positioned between neighboring pairs of the conductive structures 210, 212, 220 along the X-axis direction, as shown. The openings 224o can be formed to a depth that is substantially equal to the distance J1 described with reference to FIG. 2F.

Figure 4C:
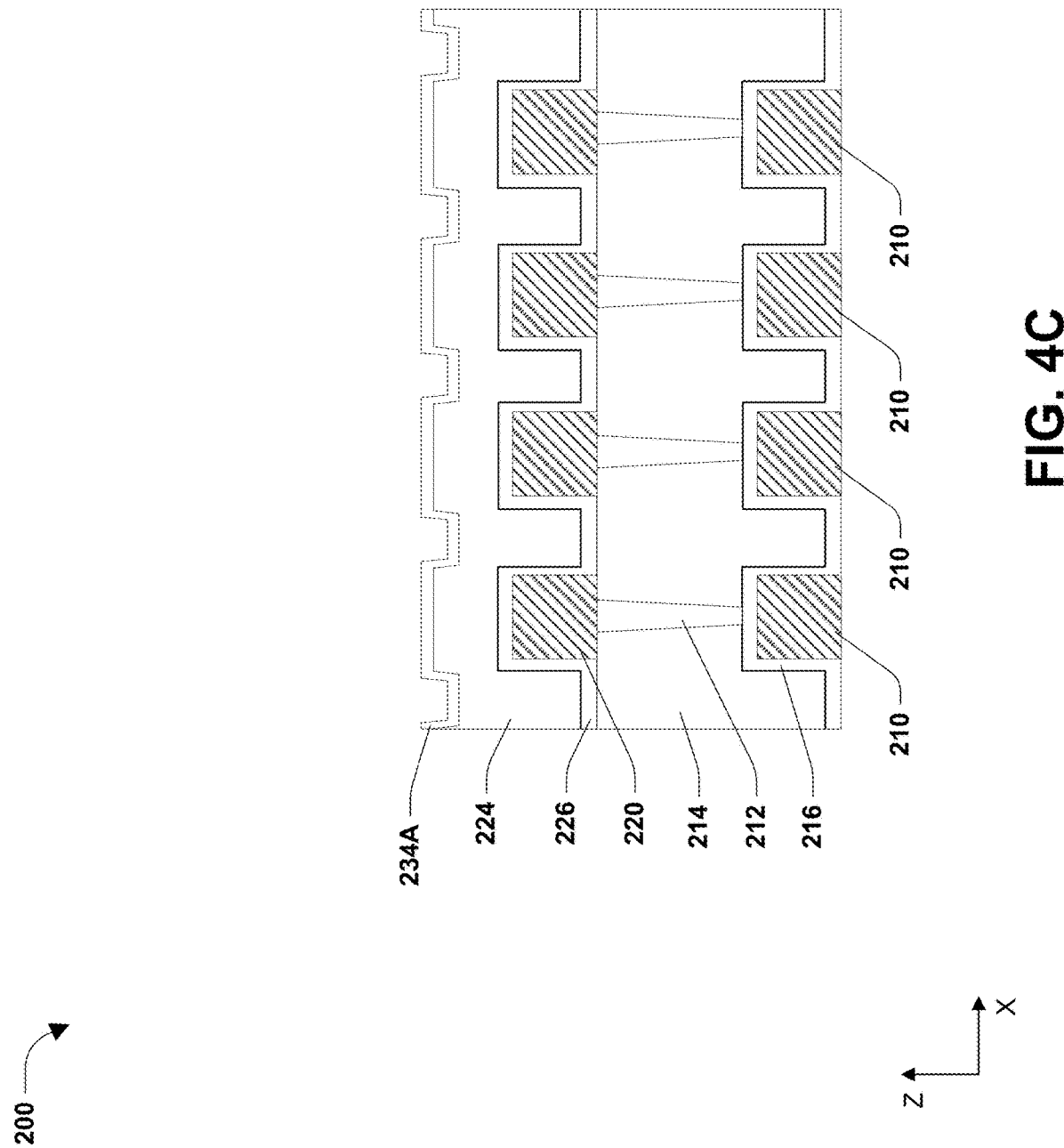

In FIG. 4C, the reflection attenuation layer 234A is formed on the dielectric layer 224. Formation of the reflection attenuation layer 234A can be similar to that described with reference to FIGS. 2E-2I. The reflection attenuation layer 234A can inherit the profile of the upper surface of the dielectric layer 224, resulting in the reflection attenuation layer 234A having elevations and depressions.

Figure 4D:
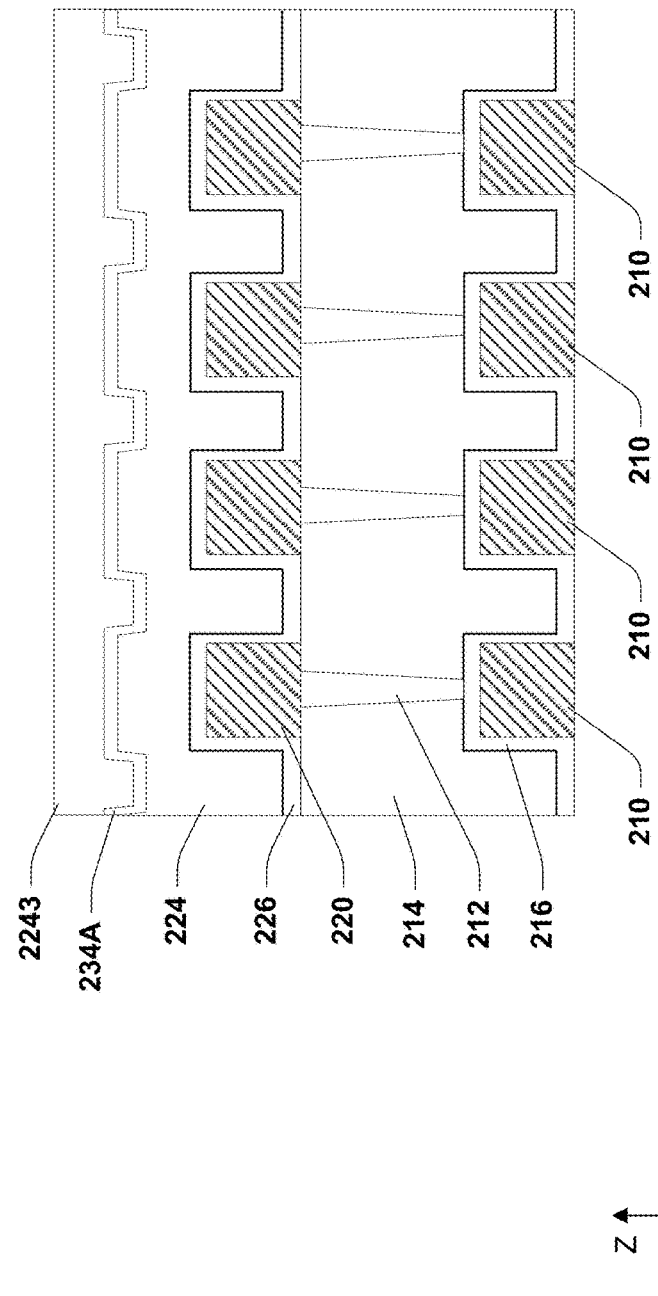

In FIG. 4D, the first intermediate dielectric layer 2243 is formed on the reflection attenuation layer 234A. The first intermediate dielectric layer 2243 may extend into the openings 224o, as shown in FIG. 4D. Formation of the first intermediate dielectric layer 2243 may be similar to that described with reference to FIGS. 2E-2I.

Formation of the reflection attenuation layers 236A, 238A is similar in most respects to that just described with reference to the reflection attenuation layer 234A.

FIGS. 5A-5D are diagrammatic views that depict formation of the reflection attenuation layer 234 having surface roughness as described with reference to FIGS. 2C and 2D.

Figure 5A:
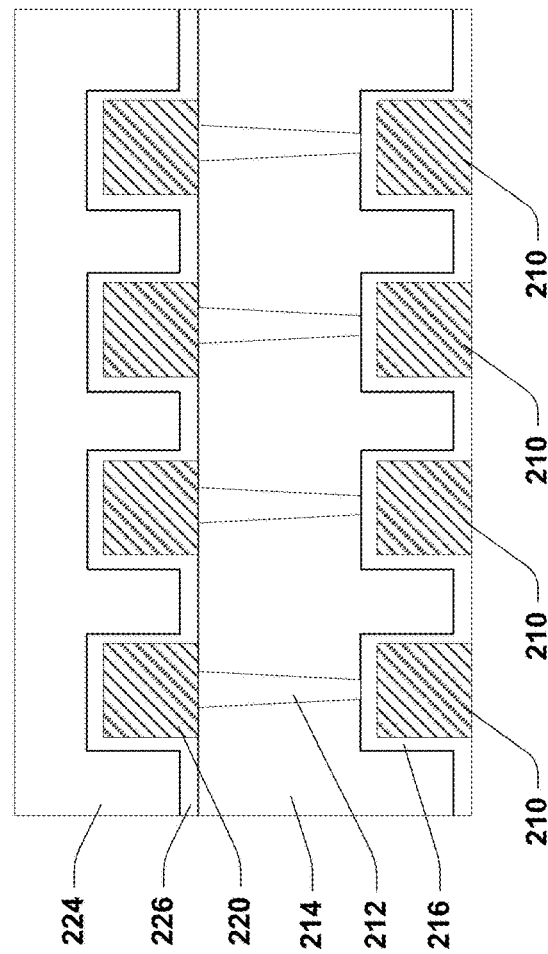
FIGS. 5A, 5B, 5C, and 5D illustrate diagrammatic side views of a display device at intermediate steps of fabrication, in accordance with some embodiments.

In FIG. 5A, the backplane 200 includes the conductive structures 210, 212, 220, the dielectric layers 214, 224 and the thin material layers 216, 226 described with reference to FIGS. 2A-2K.

Figure 5B:
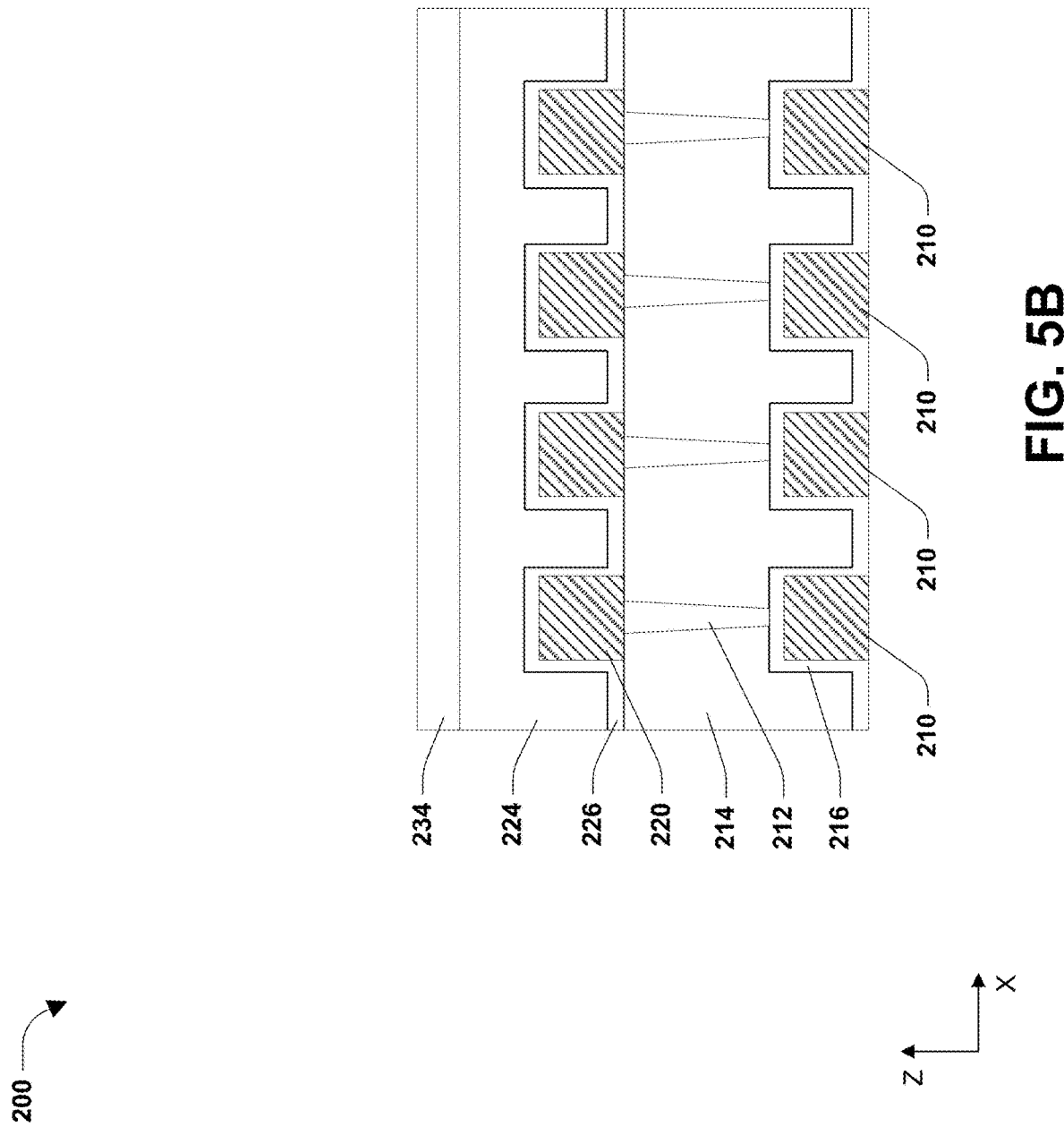

In FIG. 5B, the first reflection attenuation layer 234 is formed on the dielectric layer 224. The first reflection attenuation layer 234 can be formed by CVD, LPCVD, ALD, or the like, as described with reference to FIGS. 2C and 2D. The first reflection attenuation layer 234 can have the thickness C1 and material(s) described with reference to FIGS. 2C and 2D.

Figure 5C:
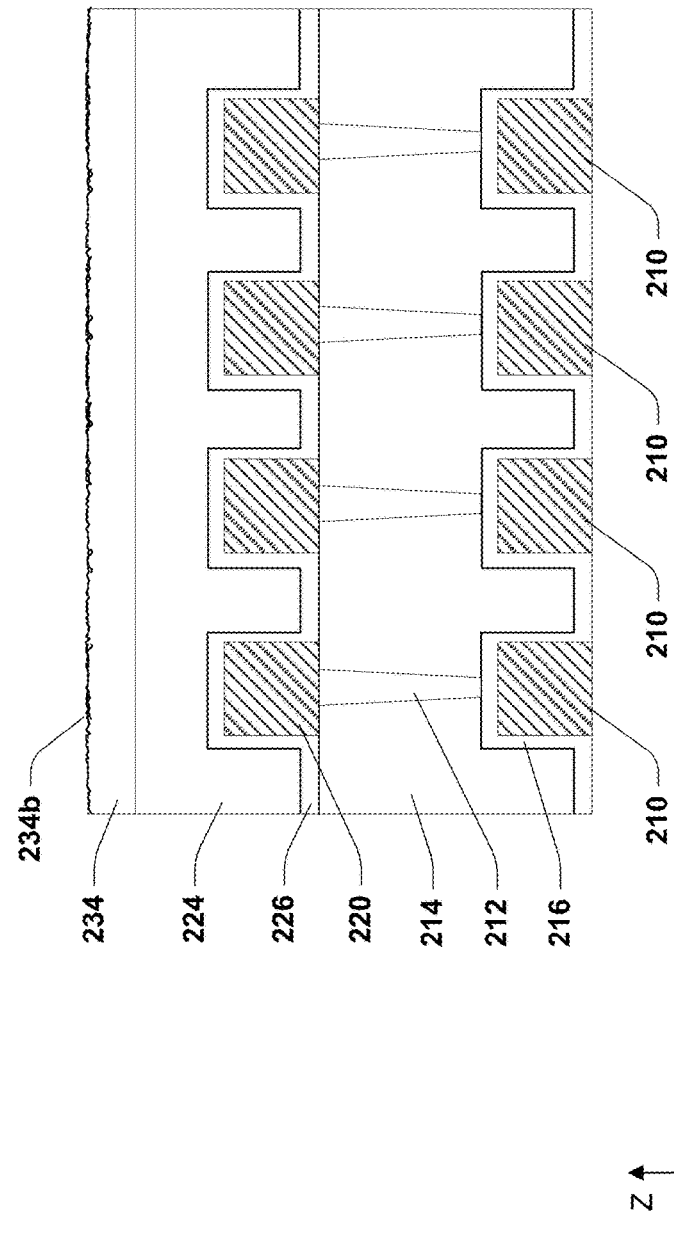

In FIG. 5C, an upper surface 234b of the first reflection attenuation layer 234 is treated to increase roughness thereof. The surface roughness can be increased by performing one or more surface treatments on the reflection attenuation layer 234 following formation of the reflection attenuation layer 234. For example, a brief wet etch may be performed in which the upper surface 234b is dipped for a few seconds (e.g., 0.5-5 seconds) in an etchant. As a result, roughness of the upper surface 234b may be increased. In some embodiments, arithmetic average roughness (Ra) of the upper surface 234b can be in a range of about 0.1 nm to about 0.5 nm, root mean square roughness (Rq) of the upper surface 234b can be in a range of about 0.2 nm and about 1 nm, and maximum height of profile (Rz) of the upper surface 234b can be in a range of about 1 nm to about 5 nm.

Figure 5D:
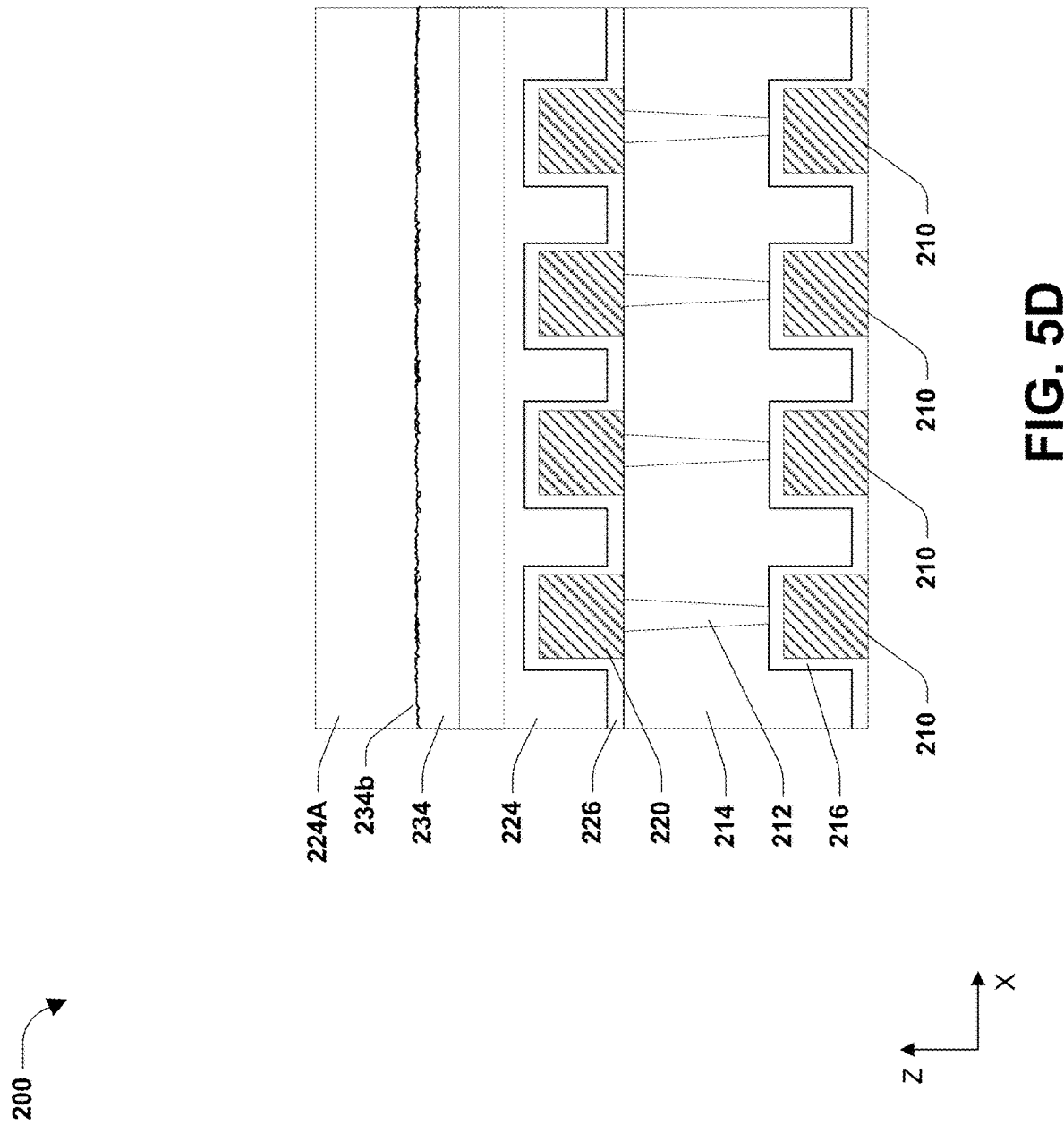

In FIG. 5D, the first intermediate dielectric layer 2243 is formed on the first reflection attenuation layer 234. The first intermediate dielectric layer 2243 can have the thickness E or the thickness E1 and can be or include any of the materials described with reference to FIGS. 2C and 2D. The first intermediate dielectric layer 2243 may be deposited using any suitable method, such as a chemical vapor deposition (CVD) process, a plasma enhanced CVD (PECVD) process, flowable CVD (FCVD) process, the like, or a combination thereof.

Roughness of the reflection attenuation layers 236, 238, 234A, 236A, 238A may be increased in a manner similar in most respects to that described with reference to FIG. 5C.

Figure 7:
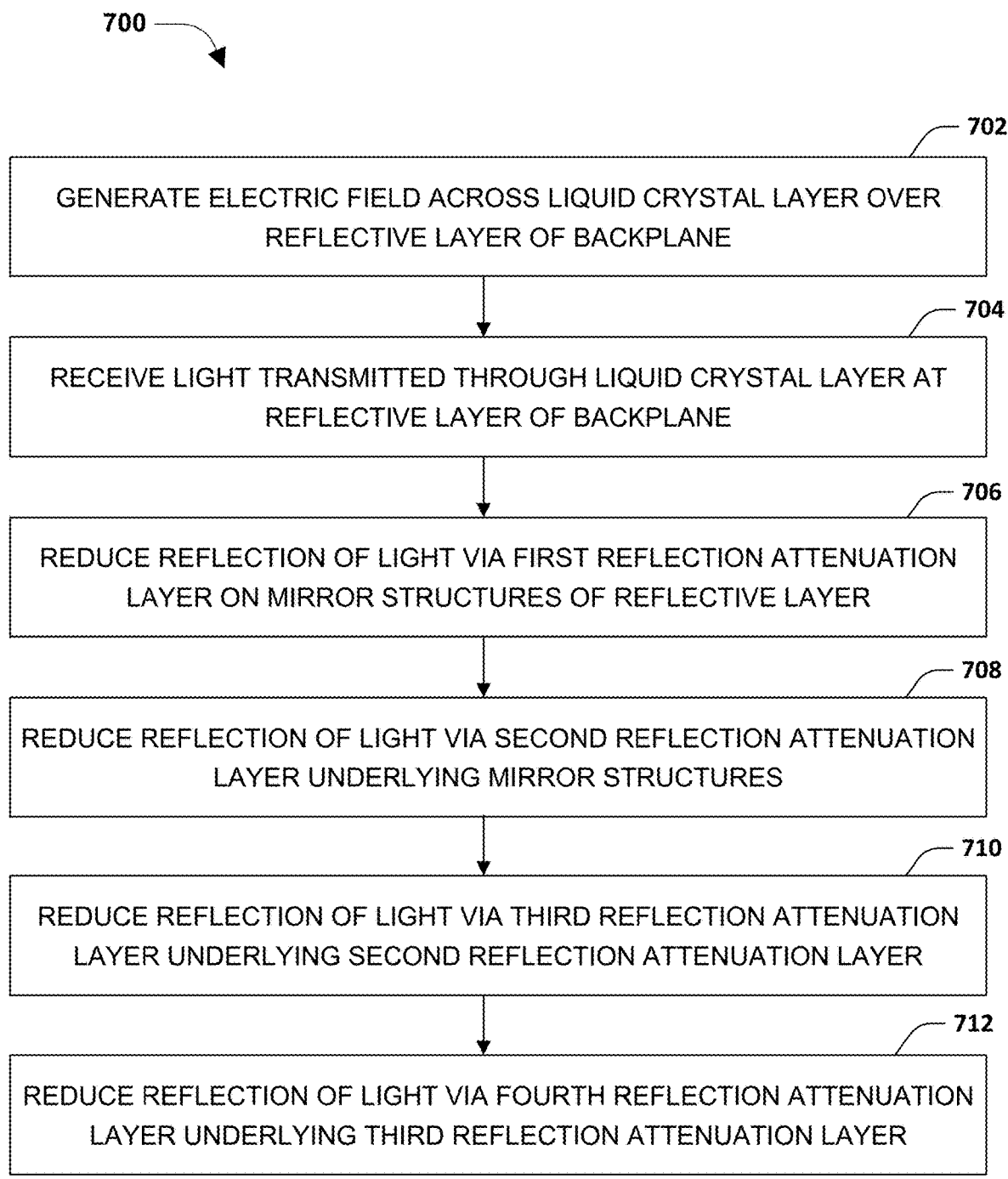
FIG. 7 is a flow diagram illustrating a method, in accordance with some embodiments.

A method 700 is illustrated in FIG. 7 in accordance with some embodiments. At 702, the method 700 includes generating an electric field across a liquid crystal layer overlying a reflective layer of a backplane. At 704, the method 700 includes receiving the light transmitted through the liquid crystal layer at the reflective layer of the backplane. At 706, the method 700 includes reducing reflection of the light via a first reflection attenuation layer on mirror structures of the reflective layer. At 708, the method 700 includes reducing reflection of the light via a second reflection attenuation layer underlying the mirror structures. At 710, the method 700 includes reducing reflection of the light via a third reflection attenuation layer underlying the second reflection attenuation layer. At 712, the method 700 includes reducing reflection of the light via a fourth reflection attenuation layer underlying the third reflection attenuation layer.

Figure 8:
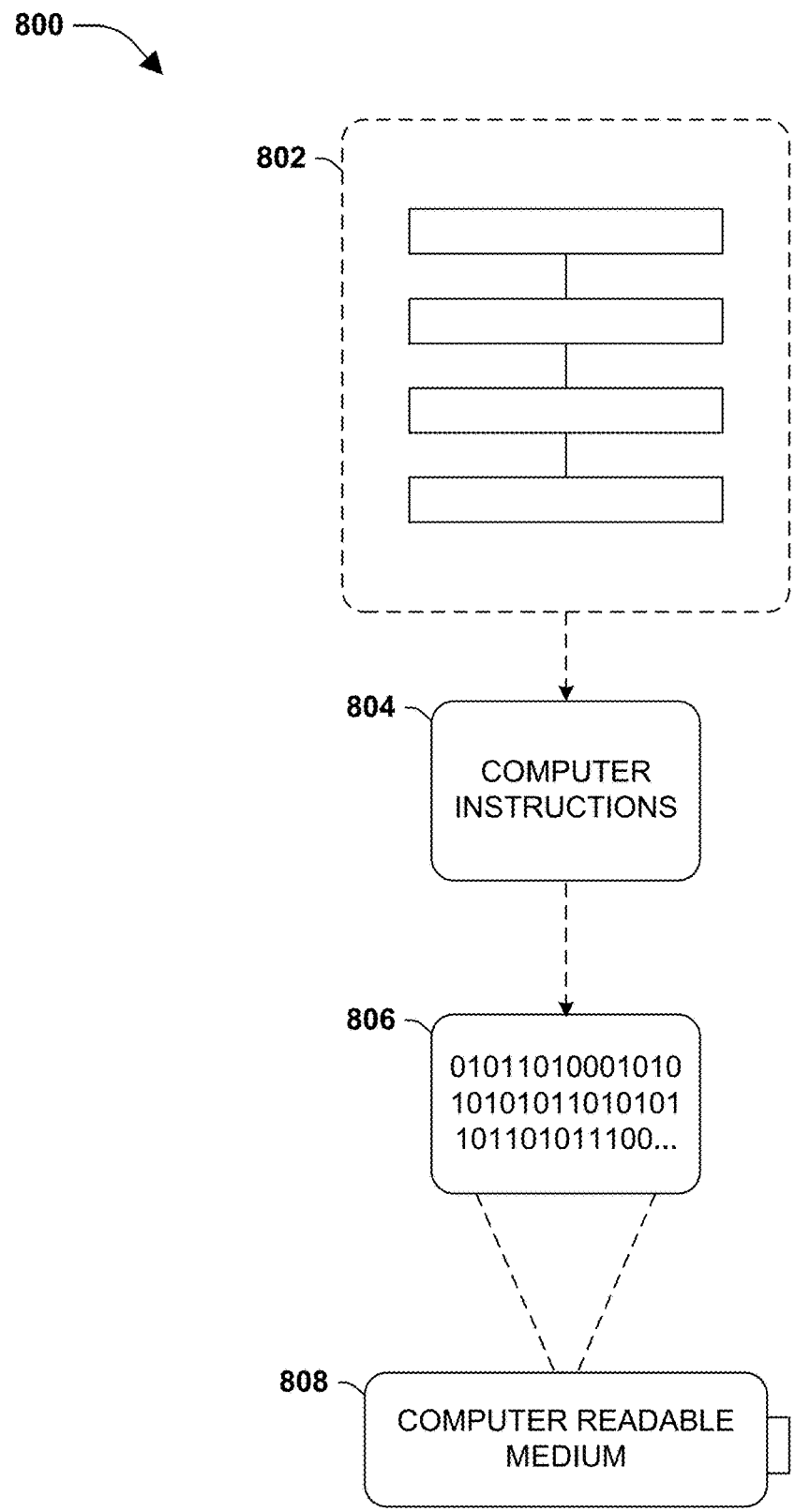
FIG. 8 illustrates an example computer-readable medium wherein processor-executable instructions configured to embody one or more of the provisions set forth herein may be comprised, according to some embodiments.

One or more embodiments involve a computer-readable medium comprising processor-executable instructions configured to implement one or more of the techniques presented herein. An exemplary computer-readable medium is illustrated in FIG. 8, wherein the embodiment 800 comprises a computer-readable medium 808 (e.g., a CD-R, DVD-R, flash drive, a platter of a hard disk drive, etc.), on which is encoded computer-readable data 806. This computer-readable data 806 in turn comprises a set of processor-executable computer instructions 804 configured to implement one or more of the principles set forth herein when executed by a processor. In some embodiments 800, the processor-executable computer instructions 804 are configured to implement a method 802, such as at least some of the aforementioned method(s) when executed by a processor. In some embodiments, the processor-executable computer instructions 804 are configured to implement a system, such as at least some of the one or more aforementioned system(s) when executed by a processor. Many such computer-readable media may be devised by those of ordinary skill in the art that are configured to operate in accordance with the techniques presented herein.

In some embodiments, a device is provided. The device comprises: a liquid crystal layer; an electrode layer on a first side of the liquid crystal layer; and a backplane attached to a second side of the liquid crystal layer opposite the first side. The backplane includes: a conductive structure operable to form a voltage difference with the electrode layer; a reflective structure between the conductive structure and the liquid crystal layer; a first reflection attenuation layer on first sidewalls of the conductive structure and a first upper surface of the conductive structure; and a second reflection attenuation layer on second sidewalls of the reflective structure, the second reflection attenuation layer defining an opening therein, a second upper surface of the reflective structure being exposed by the opening.

In some embodiments, a device is provided. The device comprises: a liquid crystal layer; an electrode layer on a first side of the liquid crystal layer; and a backplane attached to a second side of the liquid crystal layer opposite the first side. The backplane includes: a conductive structure operable to form a voltage difference with the electrode layer; a reflective structure between the conductive structure and the liquid crystal layer; a first reflection attenuation layer on first sidewalls of the conductive structure and a first upper surface of the conductive structure; a first dielectric layer between the reflective structure and the conductive structure; a second dielectric layer between the first dielectric layer and the conductive structure; and a second reflection attenuation layer between the first dielectric layer and the second dielectric layer.

In some embodiments, a method is provided. The method comprises: forming a first reflection attenuation layer over a conductive structure; forming a first dielectric layer over the first reflection attenuation layer; forming a second reflection attenuation layer over the first dielectric layer; forming a second dielectric layer over the second reflection attenuation layer; forming a plurality of mirror structures over the second dielectric layer, the plurality of mirror structures including a first mirror structure that overlaps the conductive structure; forming a liquid crystal layer over the plurality of mirror structures; and forming an electrode layer over the liquid crystal layer.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments. Additionally, a variety of techniques exist for forming layers, regions, features, elements, etc. mentioned herein, such as at least one of etching techniques, planarization techniques, implanting techniques, doping techniques, spin-on techniques, sputtering techniques, growth techniques, or deposition techniques such as chemical vapor deposition (CVD), for example.

Moreover, "exemplary" and/or the like is used herein to mean serving as an example, instance, illustration, etc., and not necessarily as advantageous. As used in this application, "or" is intended to mean an inclusive "or" rather than an exclusive "or". In addition, "a" and "an" as used in this application and the appended claims are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising". Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others of ordinary skill in the art based upon a reading and understanding of this specification and the annexed drawings. The disclosure comprises all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A device, comprising:
a liquid crystal layer;
an electrode layer on a first side of the liquid crystal layer; and
a backplane attached to a second side of the liquid crystal layer opposite the first side, the backplane including:
a conductive structure operable to form a voltage difference with the electrode layer;
a reflective structure between the conductive structure and the liquid crystal layer;
a first reflection attenuation layer on first sidewalls of the conductive structure and a first upper surface of the conductive structure; and
a second reflection attenuation layer on second sidewalls of the reflective structure, the second reflection attenuation layer defining an opening therein, a second upper surface of the reflective structure being exposed by the opening.

2. The device of claim 1, wherein a first material of the first reflection attenuation layer and a second material of the second reflection attenuation layer are a same material.

3. The device of claim 1, further comprising a first dielectric layer between the conductive structure and the reflective structure, the second reflection attenuation layer being positioned on a third upper surface of the first dielectric layer.

4. The device of claim 3, further comprising:
a second conductive structure, the conductive structure being between the second conductive structure and the reflective structure; and
a thin material layer on the second conductive structure, the thin material layer being a different material than that of the first reflection attenuation layer.

5. The device of claim 4, further comprising a second dielectric layer between the second conductive structure and the conductive structure, the first reflection attenuation layer being positioned on a fourth upper surface of the second dielectric layer.

6. The device of claim 1, wherein height of the second reflection attenuation layer exceeds width of the reflective structure.

7. The device of claim 1, wherein thickness of the first reflection attenuation layer is substantially equal to thickness of the second reflection attenuation layer.

8. A device comprising:
a liquid crystal layer;
an electrode layer on a first side of the liquid crystal layer; and
a backplane attached to a second side of the liquid crystal layer opposite the first side, the backplane including:
a conductive structure operable to form a voltage difference with the electrode layer;
a reflective structure between the conductive structure and the liquid crystal layer;
a first reflection attenuation layer on first sidewalls of the conductive structure and a first upper surface of the conductive structure;
a first dielectric layer between the reflective structure and the conductive structure;
a second dielectric layer between the first dielectric layer and the conductive structure; and
a second reflection attenuation layer between the first dielectric layer and the second dielectric layer.

9. The device of claim 8, further comprising:
a third reflection attenuation layer between the second reflection attenuation layer and the conductive structure.

10. The device of claim 9, wherein the third reflection attenuation layer has a different material than that of the second reflection attenuation layer.

11. The device of claim 9, further comprising:
a fourth reflection attenuation layer between the third reflection attenuation layer and the conductive structure.

12. The device of claim 11, wherein materials of the second, third and fourth reflection attenuation layers are different than each other.

13. The device of claim 12, wherein at least one of the second, third or fourth reflection attenuation layers includes alternating elevations and depressions.

14. The device of claim 12, wherein at least two reflection attenuation layers of the second, third or fourth reflection attenuation layers includes alternating elevations and depressions.

15. The device of claim 14, wherein one elevation each of the at least two reflection attenuation layers fully overlaps the conductive structure.

16. A method, comprising:
forming a first reflection attenuation layer over a conductive structure;
forming a first dielectric layer over the first reflection attenuation layer;
forming a second reflection attenuation layer over the first dielectric layer;
forming a second dielectric layer over the second reflection attenuation layer;
forming a plurality of mirror structures over the second dielectric layer, the plurality of mirror structures including a first mirror structure that overlaps the conductive structure;
forming a liquid crystal layer over the plurality of mirror structures; and
forming an electrode layer over the liquid crystal layer.

17. The method of claim 16, further comprising increasing surface roughness of the second reflection attenuation layer prior to forming the second dielectric layer.

18. The method of claim 17, wherein increasing the surface roughness includes forming surface roughness of the second reflection attenuation layer having at least one of arithmetic average roughness (Ra) in a range of about 0.1 nanometers (nm) to about 0.5 nm, root mean square roughness (Rq) in a range of about 0.2 nm and about 1 nm or maximum height of profile (Rz) in a range of about 1 nm to about 5 nm.

19. The method of claim 16, further including:
forming a third reflection attenuation layer over the second dielectric layer prior to forming the plurality of mirror structures, the third reflection attenuation layer including a different material than that of the second reflection attenuation layer.

20. The method of claim 19, further including:
forming a fourth reflection attenuation layer over the third reflection attenuation layer prior to forming the plurality of mirror structures, the fourth reflection attenuation layer including a different material than those of the second reflection attenuation layer and the third reflection attenuation layer.

* * * * *